(12) United States Patent
Nagasato et al.

(10) Patent No.: US 8,824,255 B2
(45) Date of Patent: Sep. 2, 2014

(54) MULTI-OUTPUT POWER SUPPLY DEVICE AND ELECTRIC APPARATUS USING SAME

(75) Inventors: Masashi Nagasato, Osaka (JP); Yujiro Okamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 273 days.

(21) Appl. No.: 13/203,560

(22) PCT Filed: Feb. 23, 2010

(86) PCT No.: PCT/JP2010/052691
§ 371 (c)(1),
(2), (4) Date: Aug. 26, 2011

(87) PCT Pub. No.: WO2010/103910
PCT Pub. Date: Sep. 16, 2010

(65) Prior Publication Data
US 2011/0307910 A1    Dec. 15, 2011

(30) Foreign Application Priority Data
Mar. 13, 2009   (JP) .................................. 2009-060449

(51) Int. Cl.
G11B 5/09    (2006.01)

(52) U.S. Cl.
USPC .................................... 369/47.38; 369/30.21

(58) Field of Classification Search
None
See application file for complete search history.

(56) References Cited

U.S. PATENT DOCUMENTS

| | | | | |
|---|---|---|---|---|
| 4,803,592 A | * | 2/1989 | Ashley | 361/79 |
| 5,235,159 A | * | 8/1993 | Kornrumpf et al. | 219/486 |
| 2005/0128667 A1 | | 6/2005 | Okada et al. | |
| 2005/0268164 A1 | | 12/2005 | Hara | |
| 2007/0258174 A1 | | 11/2007 | Yamamoto et al. | |

FOREIGN PATENT DOCUMENTS

| | | |
|---|---|---|
| JP | 2005-176558 | 6/2005 |
| JP | 2005-323479 | 11/2005 |
| JP | 2006-191705 | 7/2006 |
| JP | 2007-202281 | 8/2007 |
| JP | 2007-306637 | 11/2007 |
| JP | 2008-079429 | 4/2008 |

* cited by examiner

Primary Examiner — Joseph Feild
Assistant Examiner — Parul Gupta
(74) Attorney, Agent, or Firm — Fish & Richardson P.C.

(57) ABSTRACT

A multi-output power supply device (1) comprises a first power supply (10) for outputting a first output voltage (VDCO1); a second power supply (30) for outputting a second output voltage (VDCO3); and a reset circuit (40) for detecting an abnormality of the first output voltage (VDCO1) and for outputting a first reset signal (XRESET) to forcibly stop the output operation of the second power supply (30).

16 Claims, 20 Drawing Sheets

FIG.2

| TERMINAL NO. | TERMINAL NAME | FUNCTION |
|---|---|---|
| 1 | PGND1 | GND TERMINAL FOR 1.0 V/1.5 V OUTPUT STEP-DOWN DC/DC CONVERTER |
| 2 | SELDCO1 | OUTPUT SELECT TERMINAL FOR 1.0 V/1.5 V OUTPUT STEP-DOWN DC/DC CONVERTER |
| 3 | PVCC1 | POWER SUPPLY INPUT TERMINAL FOR 1.0 V/1.5 V OUTPUT STEP-DOWN DC/DC CONVERTER |
| 4 | AVCC | POWER SUPPLY TERMINAL FOR ANALOG SECTIONS |
| 5 | PVCC2 | POWER SUPPLY INPUT TERMINAL FOR 3.3 V OUTPUT STEP-DOWN DC/DC CONVERTER |
| 6 | SELSQ | STARTUP SEQUENCE SELECT TERMINAL FOR STEP-DOWN DC/DC CONVERTER |
| 7 | PGND2 | GND TERMINAL FOR 3.3 V OUTPUT STEP-DOWN DC/DC CONVERTER |
| 8 | DCSW2 | SWITCHING TERMINAL FOR 3.3 V OUTPUT STEP-DOWN DC/DC CONVERTER |
| 9 | RESERVE | RESERVE TERMINAL |
| 10 | VDCO2 | FEEDBACK TERMINAL FOR 3.3 V OUTPUT STEP-DOWN DC/DC CONVERTER |
| 11 | XENDWN | ENABLE TERMINAL FOR STEP-DOWN DC/DC CONVERTER (OPERATES AT XENDWN = LOW) |
| 12 | SELRST | VCC MONITORING VOLTAGE SELECT TERMINAL FOR RESET CIRCUIT |
| 13 | RESERVE | RESERVE TERMINAL |
| 14 | DCSW3 | SWITCHING TERMINAL FOR STEP-UP DC/DC CONVERTER |
| 15 | PGND3 | GND TERMINAL FOR STEP-UP DC/DC CONVERTER |
| 16 | RESERVE | RESERVE TERMINAL |
| 17 | VDCO3 | OUTPUT TERMINAL FOR STEP-UP DC/DC CONVERTER |
| 18 | RESERVE | RESERVE TERMINAL |
| 19 | FB3 | ERROR AMPLIFIER INPUT TERMINAL FOR STEP-UP DC/DC CONVERTER |
| 20 | AMPOUT3 | ERROR AMPLIFIER OUTPUT TERMINAL FOR STEP-UP DC/DC CONVERTER |
| 21 | AGND | GND TERMINAL FOR ANALOG SECTIONS |
| 22 | CSWO | OUTPUT TERMINAL FOR CURRENT SWITCH |
| 23 | CSWI | INPUT TERMINAL FOR CURRENT SWITCH |
| 24 | CSWON | CONTROL TERMINAL FOR CURRENT SWITCH (OPERATES AT CSWON = HIGH) |
| 25 | XRESET | OUTPUT TERMINAL FOR RESET CIRCUIT |
| 26 | VDCO1 | FEEDBACK TERMINAL FOR 1.0 V/1.5 V OUTPUT STEP-DOWN DC/DC CONVERTER |
| 27 | ENUP | ENABLE TERMINAL FOR STEP-UP DC/DC CONVERTER (OPERATES AT ENUP = HIGH) |
| 28 | DCSW1 | SWITCHING TERMINAL FOR 1.0 V/1.5 V OUTPUT STEP-DOWN DC/DC CONVERTER |
| BACKSIDE PAD | GND | GND PAD FOR RADIATING HEAT |

FIG.4

| XENDWN | ENUP | STEP-UP DC/DC | STEP-DOWN DC/DC | CURRENT SWITCH (CSMON = HIGH) |
|---|---|---|---|---|
| L | L | SWITCHING STOPPED OUTPUT = 0 V | OPERATING | OPERATING |
| L | H | OPERATING (DURING RESET RELEASE) | OPERATING | OPERATING |
| H | L | SWITCHING STOPPED OUTPUT = 0 V | SWITCHING STOPPED OUTPUT = 0 V | OUTPUT = 0 V |
| H | H | SWITCHING STOPPED OUTPUT = 0 V | SWITCHING STOPPED OUTPUT = 0 V | OPERATING |

FIG.7

| ITEM | SYMBOL | SPECS | UNIT | CONDITIONS |
|---|---|---|---|---|
| [OVERALL APPARATUS] | | | | |
| CURRENT CONSUMPTION | ICC | (TBD) | mA | VDCO1=0V, VDCO2=0 VFB3=2.5V CSWON=ENUP=5.0V XENDWN=0V |
| SHUTDOWN CURRENT | ISHUT | (TBD) | mA | ENUP=0V、XENDWN=5.0V |
| [INPUT I/O SECTION: APPLIED TO ENUP, XENDWIN, SELDCO1, SELSQ, CSWON TERMINALS] | | | | |
| "H" LEVEL INPUT VOLTAGE | VIOH | 2.0 | V | |
| "L" LEVEL INPUT VOLTAGE | VIOL | 0.8 | V | |
| INPUT CURRENT H | IIO1 | -5.0~5.0 | μA | INPUT = 5.0 V |
| INPUT CURRENT L | IIO2 | -5.0~5.0 | μA | INPUT = 0 V |
| [STEP-DOWN DC/DC CONVERTER SECTION] | | | | |
| VDCO1 VOLTAGE | VDCO1A | 1.500 | V | SELDCO1=0V |
| | VDCO1B | 1.000 | V | SELDCO1=5.0V |
| VDCO2 VOLTAGE | VDCO2 | 3.300 | V | |
| OSCILLATION FREQUENCY | fOSCDWN | 2.0 | MHz | |
| HIGH-SIDE SWITCH ON RESISTOR | RONH1,2 | 0.40 | Ω | |
| LOW-SIDE SWITCH ON RESISTOR | RONL1,2 | 0.30 | Ω | |
| SOFT START TIME PERIOD (DOWN) | tSFTDWN | 1.0 | ms | |
| [STEP-DOWN DC/DC CONVERTER SECTION] | | | | |
| FB(VREF) VOLTAGE | VFB3 | 0.600 | V | DURING NO-LOAD TIME PERIOD |
| OSCILLATION FREQUENCY | fOSCUP | 1.0 | MHz | |
| HIGH-SIDE SWITCH ON RESISTOR | RONH3 | 0.30 | Ω | |
| LOW-SIDE SWITCH ON RESISTOR | RONL3 | 0.30 | Ω | |
| SOFT START TIME PERIOD (UP) | tSFTUP | 6.0 | ms | DURING NO-LOAD TIME PERIOD |
| AMPOUT MAX. OUTPUT VOLTAGE | VAMPOH | 2.30 | V | |
| AMPOUT MIN. OUTPUT VOLTAGE | VAMPOL | 0.03 | V | |
| MAX. DUTY CYCLE | DMAX | 80 | % | |
| [RESET SECTION] | | | | |
| RESET ON VOLTAGE | VRSTON1A | 3.700 | V | AVCC MONITORING、SELRST=0V |
| | VRSTON1B | 4.200 | V | AVCC MONITORING、SELRST=5.0V |
| | VRSTON2A | 1.200 | V | VDCO1 MONITORING、SELDCO1=0V |
| | VRSTON2B | 0.700 | V | VDCO1 MONITORING、SELDCO1=5.0V |
| | VRSTON3 | 2.700 | V | VDCO2 MONITORING |
| RESET HYSTERESIS WIDTH | VRSTHYS1A | 100 | mV | AVCC MONITORING、SELRST=0V |
| | VRSTHYS1B | 100 | mV | AVCC MONITORING、SELRST=5.0V |
| | VRSTHYS2A | 100 | mV | VDCO1 MONITORING、SELDCO1=0V |
| | VRSTHYS2B | 100 | mV | VDCO1 MONITORING、SELDCO1=5.0V |
| | VRSTHYS3 | 100 | mV | VDCO2 MONITORING |
| RESET OUTPUT SINK VOLTAGE | VXRST | 0.3 | V | ISINK=5.0mA |
| RESET OUTPUT LEAK CURRENT | ILKXRST | -5.0~5.0 | μA | XRESET=5.0V |
| RESET DELAY TIME | tRST | 50 | ms | |
| [CURRENT SWITCH SECTION] | | | | |
| CURRENT SWITCH ON RESISTOR | RCSWO | 0.5 | Ω | CSWON=5.0V |

FIG.17

| TERMINAL NO. | TERMINAL NAME | EQUIVALENT CIRCUIT | FUNCTION |
|---|---|---|---|
| 2 | SELDC01 | 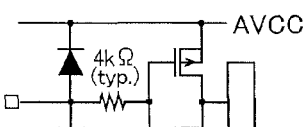 | TTL LEVEL INPUT TERMINAL |
| 6 | SELSQ | | |
| 11 | XENDWN | | |
| 12 | SELRST | | |
| 24 | CSWON | | |
| 27 | ENUP | | |
| 8 | DCSW2 | 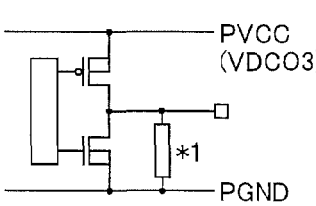 | POWER MOS DRIVER FOR SYNCHRONOUS RECTIFICATION OF DC/DC CONVERTERS<br><br>*1 CLAMPER FOR PROTECTION AGAINST ELECTROSTATIC DAMAGE |
| 14 | DCSW3 | | |
| 28 | DCSW1 | | |
| 25 | XRESET | 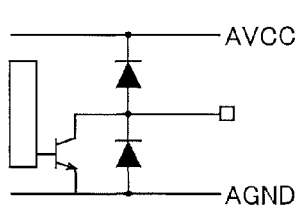 | OPEN COLLECTOR OUTPUT |
| 3 | PVCC1 | 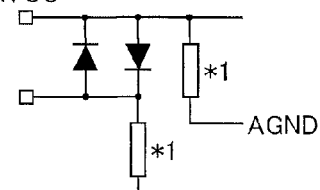 | POWER SUPPLY INPUT TERMINAL PROTECTION DIODE<br><br>*1 CLAMPER FOR PROTECTION AGAINST ELECTROSTATIC DAMAGE |
| 5 | PVCC2 | | |
| 17 | VDCO3 | 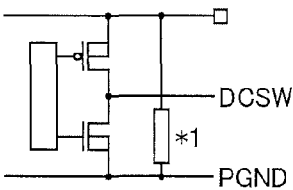 | STEP-UP DC/DC CONVERTER OUTPUT<br><br>*1 CLAMPER FOR PROTECTION AGAINST ELECTROSTATIC DAMAGE |

MULTI-OUTPUT POWER SUPPLY DEVICE AND ELECTRIC APPARATUS USING SAME

TECHNICAL FIELD

The present invention relates to a multi-output power supply device for generating a plurality of output voltages, and to an electric apparatus using the same.

BACKGROUND ART

FIG. 19 is a block diagram showing a prior art example of a system requiring a plurality of drive voltages. The system in the prior art example has a first power supply device 101 for generating output voltage OUT1, a second power supply device 102 for generating output voltage OUT2, a control device 200 for receiving a supply of output voltage OUT1 to operate, and a controlled device 300 for receiving a supply of output voltage OUT2 to operate.

A multi-channel load drive device equipped with a plurality of driver circuits for supplying drive currents to a plurality of loads was disclosed and proposed by the present applicant in Patent Document 1, the load drive device characterized in that the output operation of at least one of the driver circuits from among the plurality of driver circuits is limited or stopped not only when an abnormality occurs in this particular driver circuit, but also when an abnormality occurs in another driver circuit.

LIST OF CITATIONS

Patent Literature

Patent Document 1: Japanese Laid-open Patent Publication No. 2007-306637

SUMMARY OF INVENTION

Technical Problem

As mentioned above, a prior art system requiring a plurality of drive voltages (output voltage OUT1 supplied to the control device 200, and output voltage OUT2 supplied to the controlled device 300 in FIG. 19) often has a plurality of power supply devices (the first power supply device 101 and the second power supply device 102 in FIG. 19) operating independently as means for generating the plurality of drive voltages.

In a system in which the first power supply device 101 and the second power supply device 102 operate independently, coordinated operations cannot be performed by the first power supply device 101 and the second power supply device 102. Therefore, even when an abnormality occurs in the output voltage OUT1 of the first power supply device 101, such as a ground fault, and the controlled device 300 cannot be controlled properly by the control device 200, the second power supply device 102 continues to output output voltage OUT2 unless some abnormality occurs in the output voltage OUT2 thereof. This causes the controlled device 300 to operate abnormally.

Also, in the system of the prior art, complex software control and large-scale hardware are required to realize coordinated operations between the first power supply device 101 and the second power supply device 102. In reality, this is difficult to implement.

The prior art technology in Patent Document 1 resembles the present invention in the way in which coordinated operation is realized between a plurality of driver circuits during the occurrence of an abnormality. However, the prior art is applied to a multi-channel load drive device, and so cannot be applied to a multi-output power supply device without modification. Also, the master-slave relationship between the control device and controlled device receiving the output voltages is neither disclosed nor mentioned in Patent Document 1. Therefore, the present invention and the prior art technology in Patent Document 1 are clearly different in their basic configuration.

In view of this problem, an object of the present invention is to provide a multi-output power supply device and electric apparatus using same in which coordinated operation can be performed between a plurality of power supply circuits when an abnormality occurs.

Solution to Problem

In order to achieve this object, the present invention is a multi-output power supply device comprising a first power supply for outputting a first output voltage, a second power supply for outputting a second output voltage, and a reset circuit for detecting an abnormality of the first output voltage and for outputting a first reset signal for forcibly stopping the output operation of the second power supply (1st aspect).

The multi-output power supply device in the first aspect can also comprise a third power supply for outputting a third output voltage, wherein the reset circuit detects an abnormality in each of the first output voltage and the third output voltage, and outputs the first reset signal to forcibly stop the output operation of the second power supply (2nd aspect).

In the multi-output power supply device in the first aspect, the reset circuit can include an output abnormality detecting section for outputting the first reset signal in accordance with the first output voltage, and a timer for outputting a second reset signal to the first power supply after a predetermined period of time has elapsed since the input of the first reset signal (3rd aspect).

The multi-output power supply device in the first aspect can also comprise a first terminal to which a predetermined voltage is input, wherein the reset circuit outputs the first reset signal either when a power supply voltage is at or below the predetermined voltage, or when an abnormality of the first output voltage has been detected (4th aspect).

In the multi-output power supply device in the first aspect, the reset circuit can output a first reset signal so that the second power supply starts after the multi-output power supply device has started up, and after a predetermined period of time has elapsed since the first output voltage reached a predetermined voltage (5th aspect).

In the multi-output power supply device in the fifth aspect, the predetermined period of time can be 50 ms (6th aspect).

In the multi-output power supply device in the third aspect, a third output voltage can also be inputted to the output abnormality detecting section, and the timer can also output the second reset signal to the third power supply (7th aspect).

In the multi-output power supply device in the second aspect, the first power supply and the third power supply both can be step-down DC/DC converters, and the second power supply can be a step-up DC/DC converter (8th aspect).

In the multi-output power supply device in the eighth aspect, the first power supply, the second power supply, and the third power supply all can be DC/DC converters for synchronous rectification (9th aspect).

The multi-output power supply device in the eighth aspect can comprise the following as circuit elements forming the first power supply, the second power supply, and the third power supply: a sawtooth wave generating circuit for outputting a first sawtooth wave, a second sawtooth wave, and a third sawtooth wave; a bias circuit for generating a first reference voltage, a second reference voltage, and a third reference voltage; a first error amplifier for amplifying error between the first output voltage and the first reference voltage; a first control drive section for comparing the output of the first error amplifier to the first sawtooth wave, and for outputting the first output voltage based on the results of the comparison; a second error amplifier for amplifying the error between the second output voltage and the second reference voltage; a second control drive section for comparing the output of the second error amplifier to the second sawtooth wave, and for outputting the second output voltage based on the results of the comparison; a third error amplifier for amplifying the error between the third output voltage and the third reference voltage; and a third control drive section for comparing the output of the third error amplifier to the third sawtooth wave, and for outputting the third output voltage based on the results of the comparison (10th aspect).

In the multi-output power supply device in the tenth aspect, the first sawtooth wave and the third sawtooth wave can have opposite phases (11th aspect).

The multi-output power supply device in the first aspect can also comprise a fourth power supply that continues to perform an output operation as the fourth power supply even when an output abnormality of the first power supply has been detected (12th aspect).

The multi-output power supply device in the first aspect can also have a control circuit to which the first output voltage is supplied; and a controlled circuit to which the second output voltage is supplied, and which is controlled by the control circuit (13th aspect).

The present invention is also a multi-output power supply device having a control device power supply circuit for generating output voltage for a control device; a controlled device power supply circuit for generating output voltage for a controlled device controlled by the control device; and a reset circuit for forcibly stopping the output operation of the power supply circuit for the controlled device when an output abnormality of the power supply circuit for the control device has been detected (14th aspect).

In the multi-output power supply device in the fourteenth aspect, the power supply circuit for the control device can be a step-down DC/DC converter for stepping down an input voltage and generating an output voltage for the control device, and the power supply circuit for the controlled device can be a step-up DC/DC converter for stepping up the input voltage and generating an output voltage for the controlled device (15th aspect).

In the multi-output power supply device in the fifteenth aspect, the power supply circuit for the control device can have a first step-down DC/DC converter for outputting a first output voltage to a CPU forming the control device, and a second step-down DC/DC converter for outputting a second output voltage to memory forming the control device, and the power supply circuit for the controlled device can have a step-up DC/DC converter for outputting a third output voltage to a laser driver forming the controlled device (16th aspect).

In the multi-output power supply device in the sixteenth aspect, the reset circuit can forcibly stop the output operation of the step-up DC/DC converter when an output abnormality of either the first step-down DC/DC converter or the second step-down DC/DC converter has been detected, and the reset circuit can forcibly stop the other output operation of the first step-down DC/DC converter and the second step-down DC/DC converter when the output abnormality has continued for a predetermined period of time (17th aspect).

The multi-output power supply device in any one of the fourteenth through seventeenth aspects can have a load power supply circuit that continues to perform an output operation as the load power supply circuit even when an output abnormality has been detected in the power supply circuit for the control device (18th aspect).

The present invention is also an electric apparatus having the multi-output power supply device in the fourteenth aspect; a control device caused to operate upon receiving a power supply from the multi-output power supply device; and a controlled device caused to operate upon receiving a power supply from the multi-output power supply device, the controlled device being controlled by the control device (19th aspect).

The electric apparatus in the nineteenth aspect can also have a motor driver controlled by the control device, and a spindle motor driven by the motor driver, and the controlled device can have a pickup section for retrieving information from a disk rotated by the spindle motor (20th aspect).

Advantageous Effects of the Invention

The present invention is able to provide a multi-output power supply device and electric apparatus using same in which coordinated operation can be performed between a plurality of power supply circuits when an abnormality occurs.

BRIEF DESCRIPTION OF DRAWINGS

FIG. 2 is a table used to explain the functions of the external terminals;

FIG. 4 is a table used to explain the shutdown control using pin 11 (XENDWN) and pin 27 (ENUP);

FIG. 7 is a table showing the electrical characteristics of the multi-output power supply device 1;

FIG. 17 is a table showing equivalent circuits such as input/output for each terminal;

DESCRIPTION OF EMBODIMENTS

Figure 1:
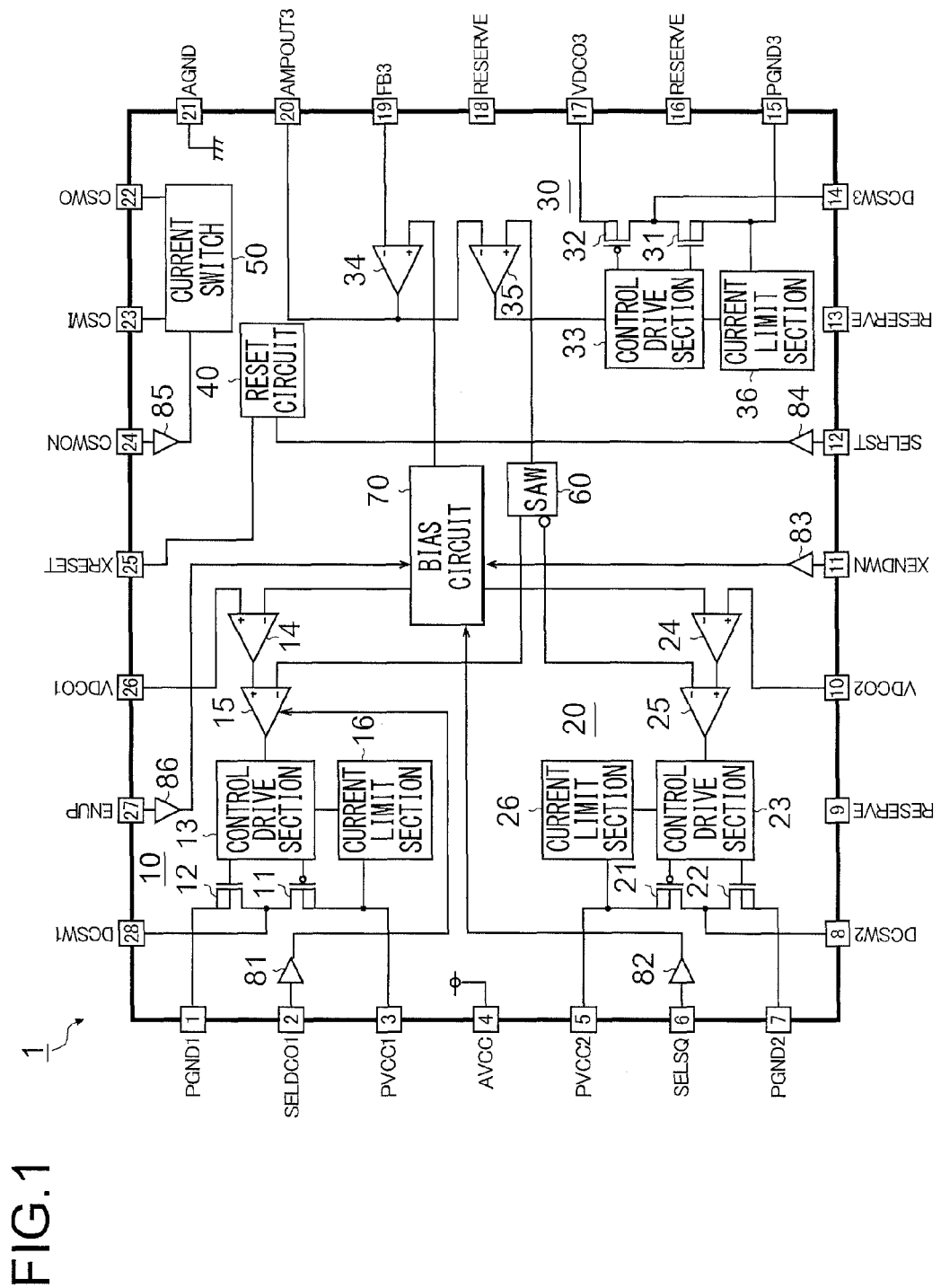
FIG. 1 is a block diagram showing the multi-output power supply device in an embodiment of the present invention.

FIG. 1 is a block diagram showing the multi-output power supply device in an embodiment of the present invention. The multi-output power supply device 1 in this embodiment is a multi-function power management IC in which power supply peripheral components for an optical disk device or general consumer product are integrated in a single chip. This multi-output power supply device has two-channel step-down DC/DC converters 10, 20, a one-channel step-up DC/DC converter 30, a reset circuit 40, a current switch 50, a sawtooth generating circuit 60, a bias circuit 70, and buffers 81 through 86. In this embodiment, the integration of these circuit elements in a single chip contributes to the saving of space in the set power supply section of the multi-output power supply device 1.

As shown in FIG. 1, the step-down DC/DC converter 10 has a P-channel MOS (metal oxide semiconductor) field-effect the transistor 11 (output switch), an N-channel MOS field-effect the transistor 12 (synchronous rectification switch), control drive section 13, an error amplifier 14, a pulse width modulation (PWM) comparator 15, and a current limit section 16.

The step-down DC/DC converter 20 has a P-channel MOS field-effect the transistor 21 (output switch), N-channel MOS field-effect transistor 22 (synchronous rectification switch), a control drive section 23, an error amplifier 24, a PWM comparator 25, and a current limit section 26.

The step-up DC/DC converter 30 has an N-channel MOS field-effect the transistor 31 (output switch), P-channel MOS field-effect the transistor 32 (synchronous rectification switch), a control drive section 33, an error amplifier 34, a PWM comparator 35, and a current limit section 36.

In order to establish electrical connections with external devices, the multi-output power supply device 1 has a plurality of external terminals (pins 1-28 and backside pad P). FIG. 2 is a table used to explain the functions of the external terminals. Pin 1 (PGND) is a GND terminal for the step-down DC/DC converter 10. Pin 2 (SELDCO1) is an output select terminal for the step-down DC/DC converter 10. Pin 3 (PVCC1) is the power supply input terminal for the step-down DC/DC converter 10. Pin 4 (AVCC) is the power supply input terminal for the analog section. Pin 5 (PVCC2) is the power supply input terminal for the step-down DC/DC converter 20. Pin 6 (SELSQ) is the startup sequence select terminal for step-down DC/DC converters 10 and 20. Pin 7 (PGND2) is the GND terminal for the step-down DC/DC converter 20. Pin 8 (DCSW2) is the switching terminal for the step-down DC/DC converter 20. Pin 9 (RESERVE) is a reserve terminal. Pin 10 (VDCO2) is a feedback terminal for the step-down DC/DC converter 20. Pin 11 (XENDWN) is an enable terminal for step-down DC/DC converters 10 and 20. Pin 12 (SELRST) is an AVCC monitoring voltage select terminal for the reset circuit 40. Pin 13 (RESERVE) is a reserve terminal. Pin 14 (DCSW3) is a switching terminal for the step-up DC/DC converter 30. Pin 15 (PGND3) is a GND terminal for the step-up DC/DC converter 30. Pin 16 (RESERVE) is a reserve terminal Pin 17 (VDCO3) is an output terminal for the step-up DC/DC converter 30. Pin 18 (RESERVE) is a reserve terminal. Pin 19 (FB3) is an error amplifier input terminal for the step-up DC/DC converter 30. Pin 20 (AMPOUT3) is an error amplifier output terminal for the step-up DC/DC converter 30. Pin 21 (AGND) is a GND terminal for the analog section. Pin 22 (CSWO) is an output terminal for the current switch 50. Pin 23 (CSWI) is a current switch input terminal. Pin 24 (CSWON) is a current switch control terminal. Pin 25 (XRESET) is a reset output terminal Pin 26 (VDCO1) is a feedback terminal for the step-down DC/DC converter 10. Pin 27 (ENUP) is an enable terminal for the step-up DC/DC converter 30. Pin 28 (DCSW1) is a switching terminal for the step-down DC/DC converter 10. The backside pad (GND) is a GND pad for radiating heat.

Pin 2, pin 6, and pin 12 are all connected to and used with a power supply or GND on the same substrate as the multi-output power supply device 1. Pin 9, pin 13, and backside pad P are all connected to and used with a GND on the same substrate as the multi-output power supply device 1. Pin 16 and pin 18 are used as open. Pin 23 is connected to and used with a power supply having the same potential as VCC on the same substrate as the multi-output power supply device 1.

The following is a detailed explanation with reference to FIG. 1 of the connections between the elements, circuit blocks, and external terminals in the multi-output power supply device 1.

The source and back gate of the transistor 11 are connected to pin 3. The drain of the transistor 11 is connected to pin 28. The gate of the transistor 11 is connected to the control drive section 13. The source and back gate of the transistor 12 are connected to pin 1. The drain of the transistor 12 is connected to pin 28. The gate of the transistor 12 is connected to the control drive section 13. The non-inverting input terminal (+) of the error amplifier 14 is connected to pin 26. The inverting input terminal (−) of the error amplifier 14 is connected to the bias circuit 70. The non-inverting input terminal (+) of the PWM comparator 15 is connected to the output terminal of the error amplifier 14. The inverting input terminal (−) of the PWM comparator 15 is connected to the output terminal of the sawtooth generating circuit 60. The output terminal of the PWM comparator 15 is connected to the control drive section 13. The current limit section 16 is connected so as to detect the current flowing to the source of the transistor 11, and transfer the detection results to the control drive section 13.

The source and back gate of the transistor 21 is connected to pin 5. The drain of the transistor 21 is connected to pin 8. The gate of the transistor 21 is connected to the control drive section 23. The source and back gate of the transistor 22 is connected to pin 7. The drain of the transistor 22 is connected to pin 8. The gate of the transistor 22 is connected to the control drive section 23. The non-inverting input terminal (+) of the error amplifier 24 is connected to pin 10. The inverting input terminal (−) of the error amplifier 24 is connected to the bias circuit 70. The non-inverting input terminal (+) of the PWM comparator 25 is connected to the output terminal of the error amplifier 24. The inverting input terminal (−) of the PWM comparator 25 is connected to the inverting output terminal of the sawtooth generating circuit 60. The output terminal of the PWM comparator 25 is connected to the control drive section 23. The current limit section 26 is connected so as to detect the current flowing to the source of the transistor 21, and transfer the detection results to the control drive section 23.

The source and back gate of the transistor 31 are connected to pin 15. The drain of the transistor 31 is connected to pin 14. The gate of the transistor 31 is connected to the control drive section 33. The source and back gate of the transistor 32 are connected to pin 17. The drain of the transistor 32 is connected to pin 14. The gate of the transistor 32 is connected to the control drive section 33. The inverting input terminal (−) of the error amplifier 34 is connected to pin 19. The non-inverting input terminal (+) of the error amplifier 34 is connected to the bias circuit 70. The output terminal of the error amplifier 34 is connected to pin 20. The inverting input terminal (−) of the PWM comparator 35 is connected to the output terminal of the error amplifier 34. The non-inverting input terminal (+) of the PWM comparator 35 is connected to the output terminal of the sawtooth generating circuit 60. The output terminal of the PWM comparator 35 is connected to the control drive section 33. The current limit section 36 is connected so as to detect the current flowing to the source of the transistor 31, and transfer the detection results to the control drive section 33.

Pin 2 is connected to the PWM comparator 15 via buffer 81. Pin 4 is connected to the power supply line. Pin 6 is connected to the bias circuit 70 via buffer 82. Pin 11 is connected to the bias circuit 70 via buffer 83. Pin 12 is connected to the reset circuit 40 via buffer 84. Pin 21 is connected to the GND line. Pin 22 and pin 23 are connected to the current switch 50. Pin 24 is connected to the current switch 50 via buffer 85. Pin 25 is connected to the reset circuit 40. Pin 27 is connected to the bias circuit 70 via buffer 86.

Figure 3:
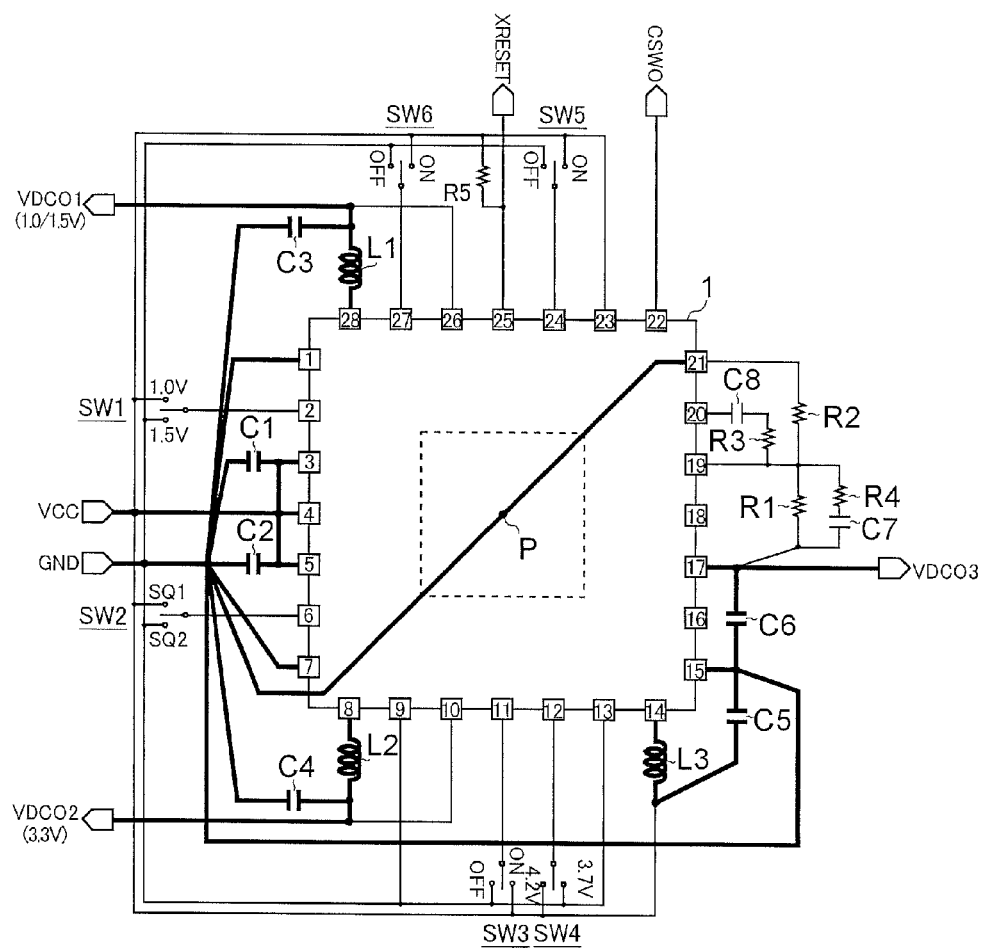
FIG. 3 is a system configuration diagram showing an example of elements connected to the multi-output power supply device 1.

FIG. 3 is a system configuration diagram showing an example of elements connected to the multi-output power supply device 1 from external sources. As shown, coils L1-L3, capacitors C1-C8, resistors R1-R5, and switches SW1-SW6 are connected to the exterior of the multi-output power supply device 1 when the system is constructed.

One end of coil L1 is connected to pin 28. The other end of coil L1 is connected to pin 26 and the output terminal of output voltage VDCO1. One end of coil L2 is connected to pin 8. The other end of coil L2 is connected to pin 10 and the output terminal of output voltage VDCO2. One end of coil L3 is connected to pin 14. The other end of coil L3 is connected to the application terminal of power supply voltage VCC.

One end of the capacitor C1 is connected to pin 3. The other end of the capacitor C1 is connected to a ground terminal. One end of the capacitor C2 is connected to pin 5. The other end of the capacitor C2 is connected to the ground terminal. One end of the capacitor C3 is connected to the other end of coil L1. The other end of the capacitor C3 is connected to the ground terminal. One end of the capacitor C4 is connected to the other end of coil L2. The other end of the capacitor C4 is connected to the ground terminal. One end of the capacitor C5 is connected to the other end of coil L3. The other end of the capacitor C5 is connected to the ground terminal. One end of the capacitor C6 is connected to pin 17. The other end of the capacitor C6 is connected to the ground terminal. One end of the capacitor C7 is connected to pin 17. The other end of the capacitor C7 is connected to pin 19 via the resistor R4. One end of the capacitor C8 is connected to pin 20. The other end of the capacitor C8 is connected to pin 19 via the resistor R3.

One end of the resistor R1 is connected to pin 17. The other end of the resistor R1 is connected to pin 19. One end of the resistor R2 is connected to pin 19. The other end of the resistor R2 is connected to pin 21. One end of the resistor R3 is connected to pin 19. The other end of the resistor R3 is connected to the other end of the capacitor C8. One end of the resistor R4 is connected to pin 19. The other end of the resistor R4 is connected to the other end of the capacitor C7. One end of the resistor R5 is connected to pin 25. The other end of the resistor R5 is connected to the application terminal of power supply voltage VCC.

The common terminal of the switch SW1 is connected to pin 2. The first selection terminal (1 V selection terminal) of the switch SW1 is connected to the application terminal of power supply voltage VCC. The second selection terminal (1.5 V selection terminal) of the switch SW1 is connected to the ground terminal. The common terminal of the switch SW2 is connected to pin 6. The first selection terminal (first sequence selection terminal) of the switch SW2 is connected to the application terminal of power supply voltage VCC. The second selection terminal (second sequence selection terminal) of the switch SW2 is connected to the ground terminal. The common terminal of the switch SW3 is connected to pin 11. The first selection terminal (ON selection terminal) of the switch SW3 is connected to the application terminal of power supply voltage VCC. The second selection terminal (OFF selection terminal) of the switch SW3 is connected to the ground terminal. The common terminal of the switch SW4 is connected to pin 12. The first selection terminal (3.7 V selection terminal) of the switch SW4 is connected to the ground terminal. The second selection terminal (4.2 V selection terminal) of the switch SW4 is connected to the application terminal of power supply voltage VCC. The common terminal of the switch SW5 is connected to pin 24. The first selection terminal (ON selection terminal) of the switch SW5 is connected to the application terminal of power supply voltage VCC. The second selection terminal (OFF selection terminal) of the switch SW5 is connected to the ground terminal. The common terminal of the switch SW6 is connected to pin 27. The first selection terminal (ON selection terminal) of the switch SW6 is connected to the application terminal of power supply voltage VCC. The second selection terminal (OFF selection terminal) of the switch SW6 is connected to the ground terminal.

Pin 1 is connected to the ground terminal. Pin 2 is connected to the common terminal of the switch SW1. Pin 3, pin 4, and pin 5 are connected to the application terminal of power supply voltage VCC. Pin 5 is connected to one end of both the capacitor C1 and the capacitor C2. Pin 6 is connected to the common terminal of the switch SW2. Pin 7 is connected to the ground terminal. Pin 8 is connected to one end of coil L2. Pin 9 is connected to the ground terminal. Pin 10 is connected to the output terminal of output voltage VDCO2. Pin 11 is connected to the common terminal of the switch SW3. Pin 12 is connected to the common terminal of the switch SW4. Pin 13 is connected to the ground terminal. Pin 14 is connected to one end of coil L3. Pin 15 is connected to the ground terminal. Pin 16 is open. Pin 17 is connected to the output terminal of output voltage VDCO3. Pin 18 is open. Pin 19 is connected to one end of both the resistor R3 and the resistor R4. Pin 20 is connected to one end of the capacitor C8. Pin 21 is connected to the other end of the resistor R2. Pin 22 is connected to the output terminal for the current switch output CSWO. Pin 23 is connected to the application terminal of power supply voltage VCC. Pin 24 is connected to the common terminal of the switch SW5. Pin 25 is connected to the output terminal for reset signal XRESET. Pin 26 is connected to the output terminal of output voltage VDCO1. Pin 27 is connected to the common terminal of the switch SW6. Pin 28 is connected to one end of coil L1. The backside pad P is connected to both pin 21 and the ground terminal.

Pin 3 through pin 5 should always be connected to the power supply on the substrate. Preferably, the wiring connected to pin 3 through pin 5 is designed with a thick, short layout, and with sufficiently low impedance. Pin 1, pin 7, pin 15, and pin 21 should always be connected to the GND on the substrate. Preferably, the wiring connected to pin 1, pin 7, pin 15, and pin 21 is designed with a thick, short layout, and with sufficiently low impedance. Preferably, output voltage VDCO1 is drawn from both ends of the capacitor C3 on the output side. Preferably, output voltage VDCO2 is drawn from both ends of the capacitor C4 on the output side. Preferably, output voltage VDCO3 is drawn from both ends of the capacitor C6 on the output side. The performance of step-down DC/DC converter 10, step-down DC/DC converter 20, and the step-up DC/DC converter 30 are all affected by the substrate pattern and peripheral components. Thus, the design of the peripheral circuits should be examined with sufficient care. The bypass capacitor C1 connected between pin 3 and pin 1, the bypass capacitor C2 connected between pin 5 and pin 7, and the capacitor C5 connected between step-up coil L3 and pin 15 are all ceramic capacitors with a low ESR (equivalent series resistance). These should be placed as close as possible to the multi-output power supply device 1. The external components such as coils L1-L3 and capacitors C1-C8 should also be placed as close as possible to the multi-output power supply device 1. The components and wiring handling large currents are preferably thick and short.

Switches SW1-SW6 do not have to be prepared as discrete components. The logic control signals mentioned above can be inputted from a logic circuit to each pin.

The first feature of a multi-output power supply device 1 with the configuration described above is a built-in synchronous rectification step-down DC/DC converter 10 that can be switched arbitrarily between 1.0 V output and 1.5 V output. The second feature is a built-in synchronous rectification step-down DC/DC converter 20 able to output 3.3 V. The third feature is a built-in synchronous rectification step-up DC/DC converter 30. The fourth feature is the suppression of ripple interference using controlled reverse-phase switching of step-down DC/DC converter 10 and step-down DC/DC converter 20. The fifth feature is high-speed switching control of step-down DC/DC converter 10, step-down DC/DC converter 20, and step-up DC/DC converter 30 (step-down DC/DC operating frequency: 2.0 MHz (typ.), step-up DC/DC operating frequency: 1.0 MHz (typ.)), and the use of compact, inexpensive coils. The sixth feature is a built-in soft start function. The seventh feature is built-in current limit sections 16, 26, 36, and a built-in short-circuit protection function for step-down DC/DC converter 10, step-down DC/DC converter 20, and current switch 50. The eighth feature is a built-in phase compensation circuit for the error amplifiers 14, 24 included in both step-down DC/DC converters 10, 20. The ninth feature is a built-in startup sequence switching function for the step-down DC/DC converters 10, 20. The tenth feature is a built-in reset circuit 40. The eleventh feature is reset detection performed in the reset circuit 40 by monitoring the analog power supply voltage AVCC, the output voltage VDCO1 of the step-down DC/DC converter 10, and the output voltage VDCO2 of the step-down DC/DC converter 20. The twelfth feature is a built-in timer circuit in the reset circuit 40 for counting the reset delay time (50 ms (typ.)). The thirteenth feature is a built-in current switch 50 (ON resistance: 1.0Ω (typ.)). The fourteenth feature is a built-in shutdown function.

The following is an explanation of the operation of each various block forming the multi-output power supply device 1.

The step-down DC/DC converter 10 and the step-down DC/DC converter 20 are both two-channel synchronous rectification step-down DC/DC converters with a built-in output-stage power MOS transistor. When the power is turned on with pin 11 (XENDWN) set to the low level, operation begins at the UVLO release voltage (3.7V (typ.)), and output voltages VDCO1 and VDCO2 are gradually raised by the soft start circuit built into the multi-output power supply device 1 (not shown in FIG. 1; soft start time period: 1.0 ms (typ.)) based on the startup sequence set by pin 6 (SELSQ). After the power has been turned on and ON/OFF control has been performed using pin 11 (XENDWN), the startup operation for step-down DC/DC converter 10 and step-down DC/DC converter 20 is the same as the one described above. Output voltage VDCO1 is 1.5 V when pin 2 (SELDCO1) is at the low level, and 1.0 V when the pin is at the high level. Output voltage VDCO2 is fixed at 3.3 V. Step-down DC/DC converter 10 and step-down DC/DC converter 20 stop switching during shutdown, and are discharged by the built-in resistors. The step-down DC/DC converter 10 and the step-down DC/DC converter 20 require certain external components (coils, output capacitors, the bypass capacitors) as shown in FIG. 3.

The step-up DC/DC converter 30 is a synchronous rectification step-up DC/DC converter with a built-in output-stage power MOS transistor. When pin 27 (ENUP) is fixed at the high level, the built-in inrush current suppression function built into the step-up DC/DC converter 30 is effective only for 5 ms (typ.) when the reset release operation has been confirmed (i.e., when pin 25 (XRESET) has been switched from the low level to the high level), and output voltage VDCO3 is gradually raised to the vicinity of the potential of the power supply voltage VCC. After another 1 ms (typ.) has elapsed, the step-up DC/DC converter 30 gradually raises output voltage VDCO3 to the output voltage setting using the soft start circuit built into the multi-output power supply device 1. In the reset release state (pin 25 (XRESET) in the high-level state), the startup operation for the step-up DC/DC converter 30 is the same as above even when ON/OFF control has been performed using pin 27 (ENUP). The inrush current suppression function has maximum effect when the load current is zero at startup, a no output current state is preferred as much as possible at startup. The duty of the PWM signals used by the step-up DC/DC converter 30 is set internally so as top be limited to 80% (typ.). During shutdown, the load from the output terminal of the step-up DC/DC converter 30 is completely blocked by the back gate control, and the step-up DC/DC converter 30 is discharged by the built-in resistors. The step-up DC/DC converter 30 requires certain external components (coils, output capacitors, the bypass capacitors) as shown in FIG. 3.

Because the reset circuit 40 is an open collector output reset circuit, the pin 25 serving as the output terminal for the reset signal XRESET has to be connected to a pull-up resistor R5 as shown in FIG. 3. When the output transistor in the reset circuit 40 is in the ON state, the value of the pull-up resistor R5 is preferably set to a resistance value that does not exceed the maximum value of the current (sink current) flowing into the output transistor. The reset circuit 40 turns on its output transistor and sets the reset signal XRESET to the low level when any one of the following conditions has been satisfied: the power supply voltage VCC is equal to or lower than the detection voltage set using pin 12 (SELRST), either the output voltage VDCO1 of the step-down DC/DC converter 10 or the output voltage VDCO2 of the step-down DC/DC converter 20 is equal to or lower than the set detection voltage, or a shutdown command has been issued. When all of the conditions for startup detection of the power supply voltage VCC, startup detection of the step-down DC/DC converter 10 and step-down DC/DC converter 20, and shutdown mode release detection have been satisfied during the reset release operation, the reset circuit 40 starts the counting performed by the timer circuit (not shown in FIG. 1) built into the multi-output power supply device 1, turns off its own output transistor to release the reset state after 50 ms (typ.) has elapsed, and sets the reset signal XRESET to the high level.

When pin 24 (CSWON) is at the high level, the current switch 50 turns on the built-in switch element (PMOS transistor). When pin 24 (CSWON) is at the low level, the current switch 50 turns off the built-in switch element, and performs a discharge using the built-in resistors. The current switch 50 can be used with the power supply voltage VCC connected on the pin 23 (CSWI) side, and a load connected on the pin 24 (CSWO) side.

The multi-output power supply device 1 also has an overcurrent/short-circuit protection function for protecting the IC against overcurrents and output short circuits, a thermal shutdown function for preventing thermal breakdown of the IC, an overvoltage mute function for preventing IC malfunctions caused by overvoltage, an UVLO function for preventing IC malfunctions caused by undervoltage, a shutdown function for forcibly stopping the output operation of the DC/DC converters, and a startup sequence switching function for switching the startup order of the step-down DC/DC converters.

For the overcurrent/short-circuit protection function, the multi-output power supply device 1 has a built-in overcurrent protection circuit (current limit section 36) for the current flowing to the NMOS transistor 31 in the step-up DC/DC converter 30. The multi-output power supply device 1 also has overcurrent protection circuits (current limit section 16, 26) for the current flowing to the PMOS the transistor 11 in step-down DC/DC converter 10, and for the current flowing to the PMOS the transistor 21 in step-down DC/DC converter 20. In addition, the multi-output power supply device 1 has an overcurrent protection circuit (not shown in FIG. 1) for the current flowing to the current switch 50. The multi-output power supply device 1 also has a short-circuit protection circuit (not shown in FIG. 1) for detecting an output short in the step-down DC/DC converter 10, step-down DC/DC converter 20, and current switch 50.

For the UVLO function, the multi-output power supply device 1 activates the shutdown function for preventing an IC malfunction caused by undervoltage when the power supply voltage VCC is 3.6 V (typ.). When the power supply voltage VCC returns to 3.7 V (typ.) or to a higher level, the multi-output power supply device 1 releases the shutdown function and restarts.

For the shutdown function, the multi-output power supply device 1 is able to perform shutdown control of both the step-down operations and step-up operations of the DC/DC converters 10-30 using pin 11 (XENDWN) and pin 27 (ENUP). FIG. 4 is a table used to explain the shutdown control using pin 11 (XENDWN) and pin 27 (ENUP). When pin 11 (XENDWN) is the shutdown logic (high level) for the step-down operation, and pin 27 (ENUP) is the shutdown logic (low level) for the step-up operation, the entire IC is in shutdown mode. When the shutdown control described above is performed using pin 11 (XENDWN) and pin 27 (ENUP), the shutdown interval (the high-level interval for pin 11 (XENDWN) and the low-level interval for pin 27 (ENUP)) is preferably 100 μs. However, when the reset signal XRESET outputted from the reset circuit 40 is at the low level (reset state), the step-down operation and step-up operation are forcibly stopped regardless of the logic of pin 11 (XENDWN) and pin 27 (ENUP).

For the shutdown sequence switching function, the multi-output power supply device 1 can switch the startup order of the step-down DC/DC converter 10 and step-down DC/DC converter 20 using pin 6 (SELSQ) (see FIG. 8 below). When pin 6 (SELSQ) is at the low level, output voltage VDCO1 and output voltage VDCO2 begin startup at the same time (same ratio startup). When pin 6 (SELSQ) is at the high level, only output voltage VDCO1 begins startup. Output voltage VDCO2 begins startup only after output voltage VDCO1 has reached 1.3 V (for the 1.5 V output setting) or 0.8 V (for the 1.0 V output setting). For the shutdown operation, output voltage VDCO1 and output voltage VDCO2 shut down using the same timing regardless of the logic of pin 6 (SELSQ). The time required for shutdown is determined based on the state of the load.

Figure 5:
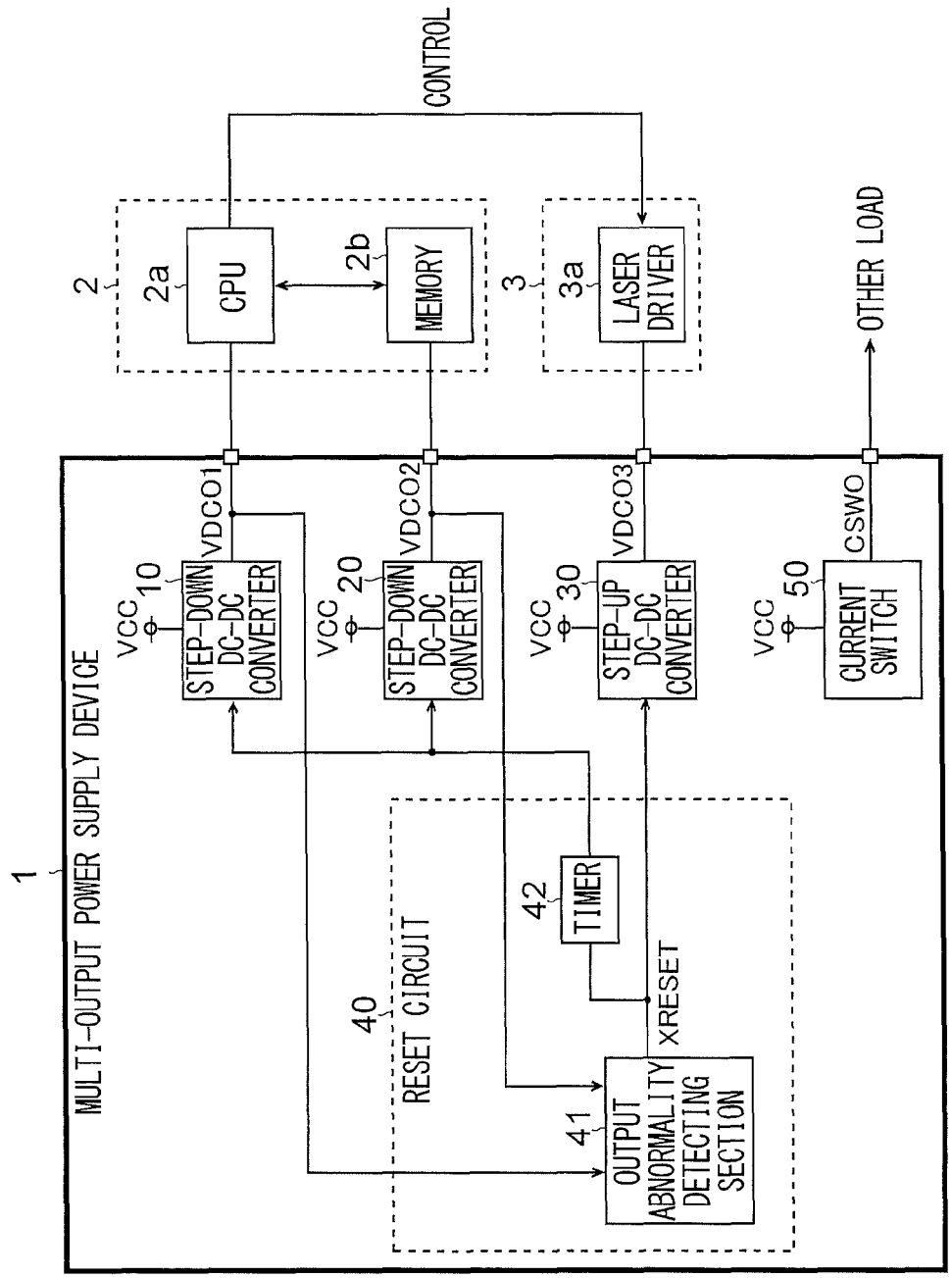
FIG. 5 is a block diagram showing a configuration example of a reset circuit 40.

The following is a detailed explanation of the coordinated operations performed by a plurality of power supply circuits when an abnormality occurs. FIG. 5 is a block diagram showing a configuration example of a reset circuit 40. FIG. 5 shows an electric apparatus (e.g., an optical disk device) serving as an example of a system requiring a plurality of drive voltages. This electric apparatus has a multi-output power supply device 1, a control device 2 receiving power supplied by the multi-output power supply device 1 to operate, and a controlled device 3 receiving power supplied by the multi-output power supply device 1 to operate and controlled by the control device 2.

In this embodiment, the multi-output power supply device 1 has a step-down DC/DC converter 10 for outputting output voltage VDCO1 to the central processing unit (CPU) 2a forming the control device 2, and a step-down DC/DC converter 20 for outputting output voltage VDCO2 to the memory 2b also forming the control device 2. These converters constitute the power supply circuit for the control device which generates the output voltages for the control device 2. The multi-output power supply device 1 also has a step-up DC/DC converter 30 for outputting output voltage VDCO3 to the laser driver 3a forming the controlled device 3. This converter constitutes the power supply circuit for the controlled device which generates the output voltage for the controlled device 3 controlled by the control device 2. The multi-output power supply device 1 in this embodiment also has a reset circuit 40 for forcibly stopping the output operation of the power supply circuit for the controlled device (step-up DC/DC converter 30) when an output abnormality is detected in the power supply circuit for the control device (in either step-down DC/DC converter 10 or step-down DC/DC converter 20).

As shown in FIG. 5, the reset circuit 40 has an output abnormality detecting section 41 and a timer latch section 42. The output abnormality detecting section 41 detects an output abnormality (e.g., ground fault) in output voltage VDCO1 and output voltage VDCO2, and generates a reset signal XRESET. The reset signal XRESET is a binary signal that is at the high level during normal operation and is at the low level when an abnormality has occurred. The timer latch section 42 latches and outputs the logic level when the reset signal XRESET has been maintained at the low level for a predetermined time interval tm (e.g., 1.5 ms (typ.)). The reset signal XRESET is inputted directly to the shutdown control terminal in the step-up DC/DC converter 30, and the output signal from the timer latch section 42 is inputted to the shutdown control terminal in the step-down DC/DC converter 10 and the step-down DC/DC converter 20.

Figure 20:
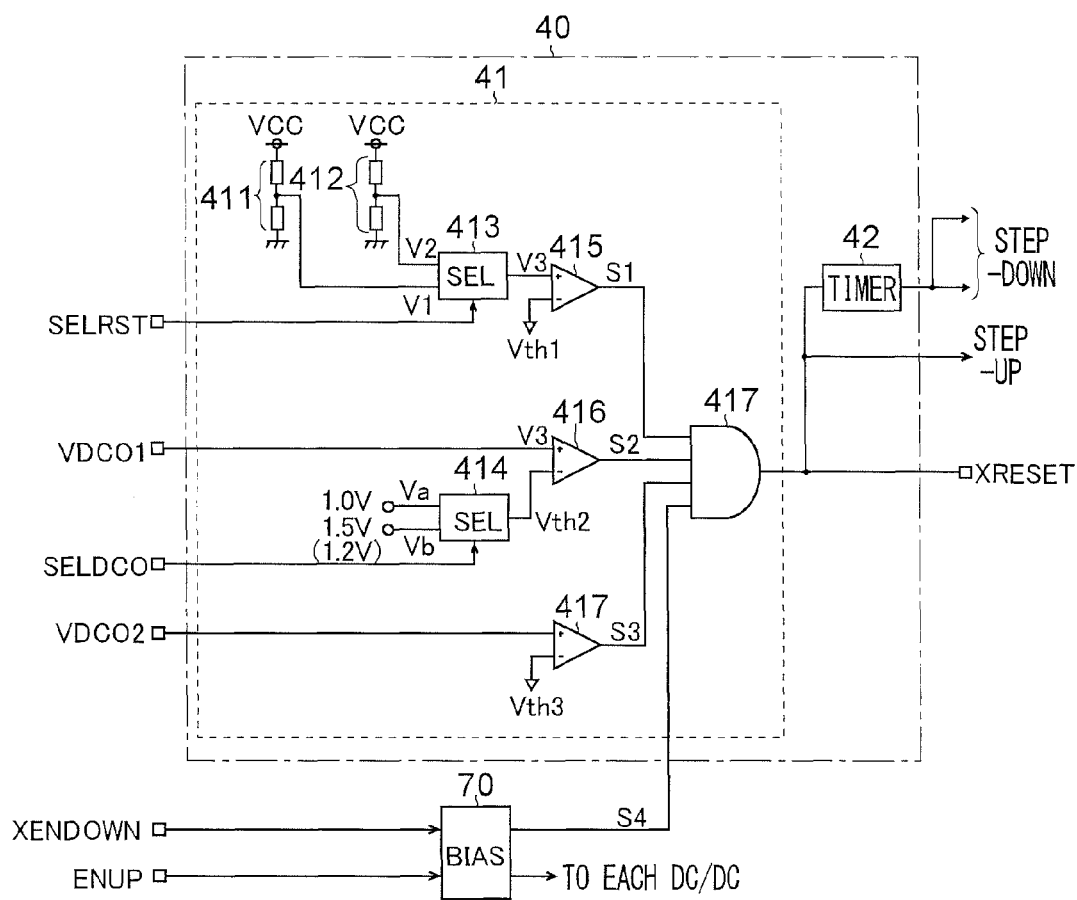
FIG. 20 is a block diagram showing a configuration example of an output abnormality detecting section 41.

FIG. 20 is a block diagram showing a configuration example of an output abnormality detecting section 41. In this configuration example, the output abnormality detecting section 41 has a 1st voltage divider 411, 2nd voltage divider 412, 1st selector 413, 2nd selector 414, 1st comparator 415, 2nd comparator 416, 3rd comparator 417, and an AND operator 418.

The first voltage divider 411 divides power supply voltage VCC by a first voltage-dividing ratio to generate a first divided voltage V1.

The second voltage divider 412 divides power supply voltage VCC by a second voltage-dividing ratio different from the first voltage-dividing ratio to generate a second divided voltage V2.

The first selector 413 selects and outputs either the first divided voltage V1 or the second divided voltage V2 as the power supply monitor voltage V3 based on the input signal to pin 12 (SELRST).

The second selector 414 selects and outputs either a first target voltage Va (e.g., 1.0 V) or a second target voltage Vb (e.g., 1.5 V or 1.2 V) as a second threshold voltage Vth2 based on the input signal to pin 2 (SELDCO1).

The first comparator 415 compares the power supply monitor voltage V3 inputted to the non-inverting input terminal (+) to the first threshold value Vth1 inputted to the inverting input terminal (−), and generates a signal S1. This signal S1 is at the high level when the power supply monitor voltage V3 is higher than the 1st threshold voltage Vth1 and at the low level when the monitor voltage is lower than the threshold voltage.

The second comparator 416 compares the output voltage VDCO1 inputted to the non-inverting input terminal (+) to the second threshold value Vth2 inputted to the inverting input terminal (−), and generates a signal S2. This signal S2 is at the high level when the output voltage VDCO1 is higher than the 2nd threshold voltage Vth2 and at the low level when the output voltage is lower than the threshold voltage.

The third comparator 417 compares the output voltage VDCO2 inputted to the non-inverting input terminal (+) to a third threshold value Vth3 inputted to the inverting input terminal (−), and generates a signal S3. This signal S3 is at the high level when the output voltage VDCO2 is higher than the 3rd threshold voltage Vth3 and at the low level when the output voltage is lower than the threshold voltage.

Signals S1-S3 are inputted to the AND operator 418. In addition, signal S4, which is at the high level during operation and at the low level during shutdown, is inputted from the bias circuit 70. The logical product of signals S1-S4 is outputted as the reset signal XRESET. Here, the reset signal XRESET is at the low level when any one of signals S1-S4 is at the low level, and at the high level when all of the signals S1-S4 are at the high level.

Because of the operation of the output abnormality detecting section 41 having this configuration, the reset circuit 40, as mentioned above, sets the reset signal XRESET to the low level when any one of the following conditions has been satisfied: the power supply voltage VCC is equal to or lower than the detection voltage set using pin 12 (SELRST), either the output voltage VDCO1 of the step-down DC/DC converter 10 or the output voltage VDCO2 of the step-down DC/DC converter 20 is equal to or lower than the set detection voltage, or a shutdown command has been issued.

Figure 6A:
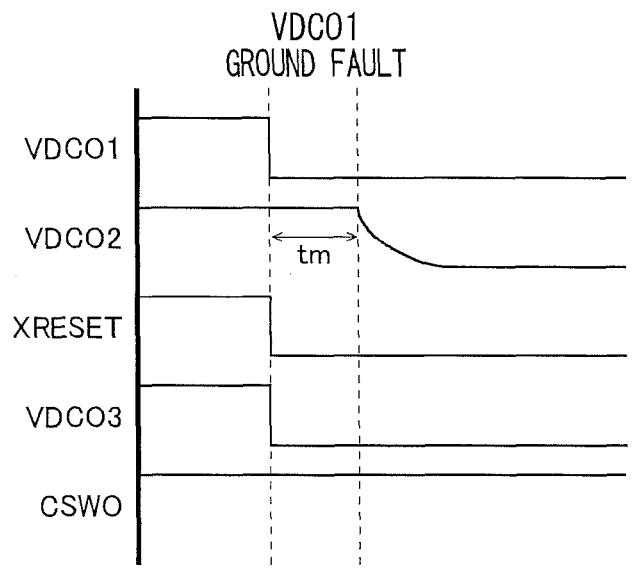
FIG. 6A is a voltage waveform diagram showing the shutdown operation during a VDCO1 ground fault.
Figure 6B:
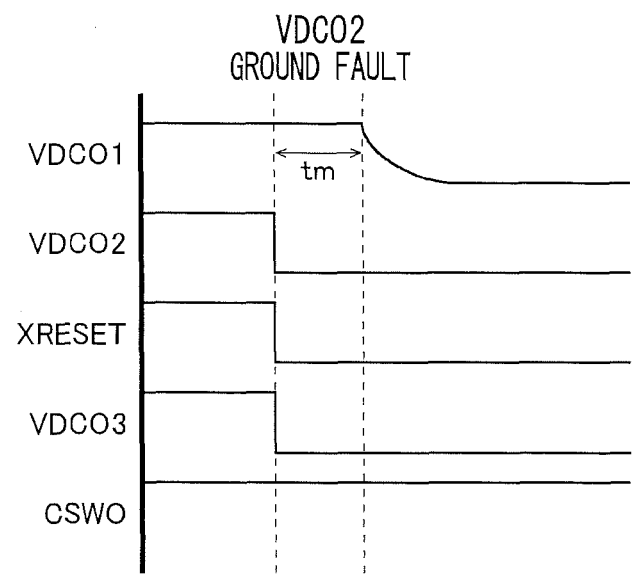
FIG. 6B is a voltage waveform diagram showing the shutdown operation during a VDCO2 ground fault.

The following is a detailed explanation with reference to FIG. 6A and FIG. 6B of the operation of the reset circuit 40 and, more specifically, the operation of the reset circuit 40 when an abnormality occurs in output voltage VDCO1 or output voltage VDCO2. FIG. 6A is a voltage waveform diagram showing the shutdown operation during a output voltage VDCO1 ground fault, and FIG. 6B is a voltage waveform diagram showing the shutdown operation during a VDCO2 ground fault. In both FIG. 6A and FIG. 6B, the voltage waveforms are rendered in order from the top for output voltage VDCO1, output voltage VDCO2, reset signal XRESET, output voltage VDCO3, and current switch output voltage CSWO.

As shown in FIG. 6A, the reset circuit 40 sets the reset signal XRESET to the low level and forcibly stops the output operation of the step-up DC/DC converter 30 when a ground fault of output voltage VDCO1 has been detected. Also, the reset circuit 40 sets the output signal from the timer latch section 42 to the low level and forcibly stops the output operation of the step-down DC/DC converter 20 when the ground fault of output voltage VDCO1 continues after a predetermined time period tm.

Similarly, as shown in FIG. 6B, the reset circuit 40 sets the reset signal XRESET to the low level and forcibly stops the output operation of the step-up DC/DC converter 30 when a ground fault of output voltage VDCO2 has been detected. Also, the reset circuit 40 sets the output signal from the timer latch section 42 to the low level and forcibly stops the output operation of the step-down DC/DC converter 10 when the ground fault of output voltage VDCO2 continues after a predetermined time period tm.

In this embodiment, the multi-output power supply device 1 takes into account the possibility of a control malfunction of the controlled device 3 by the control device 2 when an abnormality such as a ground fault occurs in either output VDCO1 or output voltage VDCO2 supplied to the control device 2. Therefore, even when there is no abnormality in output voltage VDCO3 supplied to the controlled device 3, malfunctioning of the controlled device 3 as well as overheating, fires and smoking resulting from malfunctioning of the controlled device 3 can be avoided by promptly stopping the output operation of the step-up DC/DC converter 30 and cutting off the supply of power to the controlled device 3.

As explained above, the cooperation between the step-down DC/DC converter 10 and the step-down DC/DC converter 20 when an abnormality occurs is such that one is shut down only when an output abnormality continues to occur in the other one after a predetermined period of time tm. This configuration can thus improve the stability of the system when an abnormality occurs.

In other words, in the multi-output power supply device 1 in this embodiment, improved system safety is given precedence in the supply of power to the controlled device 3 which receives power voltage VDCO3 from the step-up DC/DC converter 30 to operate. This is promptly shut down when an abnormality occurs. Improved system stability is also given precedence in the supply of power to the control device 2 which receives power voltage VDCO1 and power voltage VDCO2, respectively, from step-down DC/DC converter 10 and step-down DC/DC converter 20 to operate. This is shut down when detection of an abnormality continues after a predetermined period of time tm. Thus, this configuration can be used to improve both system safety and system stability.

As explained above, the multi-output power supply device 1 in this embodiment can achieve cooperation between a plurality of power supply circuits when an abnormality occurs, using a reset circuit 40 equipped with an output abnormality detecting section 41. Therefore, systems in which the multi-output power supply device 1 of the present embodiment is used allow risk to be readily reduced when a set is constructed, and the incidence of complaints for the set as a whole to be minimized. Also systems in which the multi-output power supply device 1 of the present embodiment is used do not require complicated software control or large-scale hardware in the set to achieve cooperation between a plurality of power supply circuits when an abnormality occurs. This holds down the cost of the set.

Also, the multi-output power supply device 1 in this embodiment has a current switch 50 as a load power supply circuit that continues to perform an output operation as the load power supply circuit even when an output abnormality has been detected in the step-down DC/DC converter 10 and step-down DC/DC converter 20 (see current switch output voltage CSWO in FIG. 6A and FIG. 6B). Because a load not being controlled by the control device 2 can continue to receive power from the multi-output power supply device 1 in this configuration, operation of the entire system does not have to be stopped.

FIG. 7 is a table showing the electrical characteristics of the multi-output power supply device 1. Here, PVCC1=PVCC2=AVCC=5.0 V and Ta=25° C. unless otherwise noted.

Figure 8:
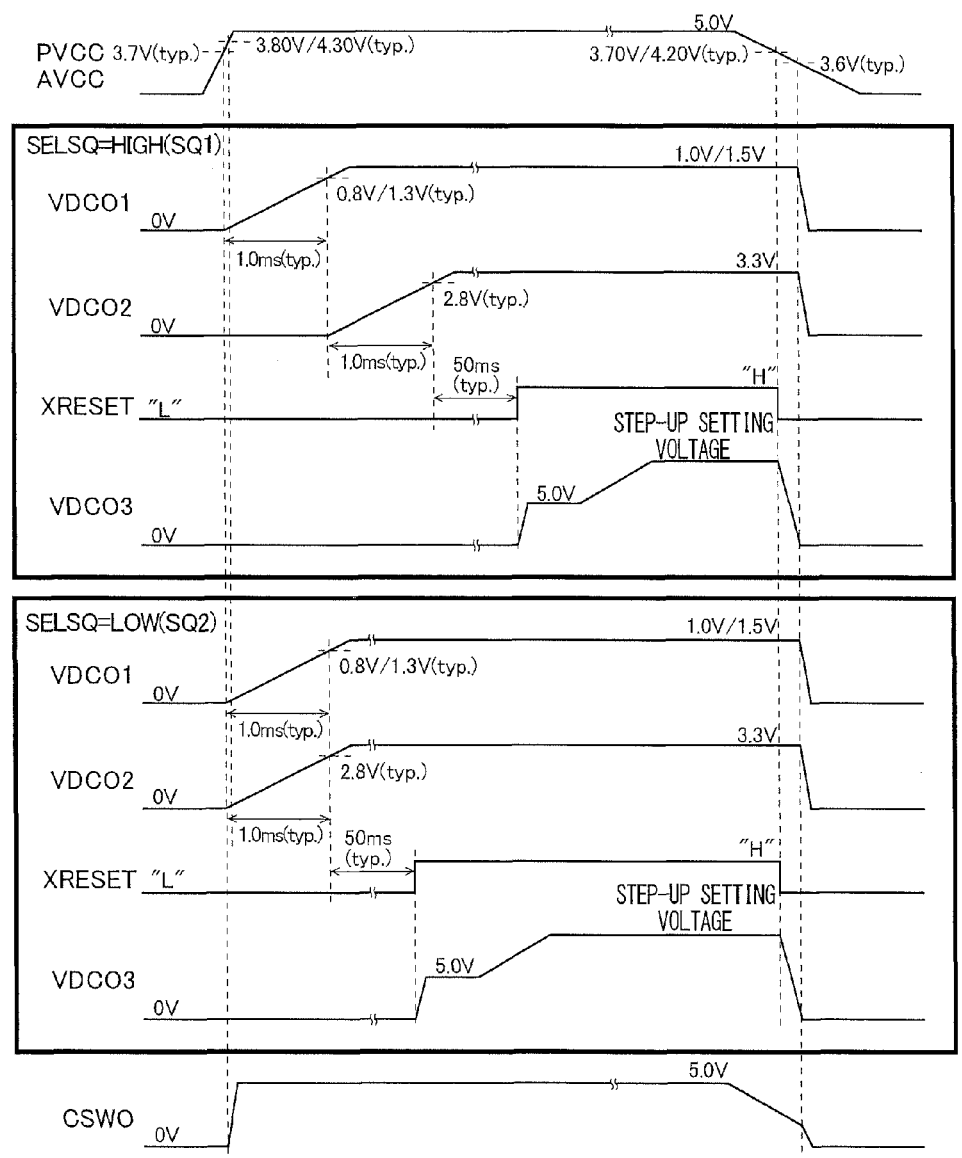
FIG. 8 is a timing chart showing the startup waveforms of each output voltage.

The following is a detailed explanation with reference to FIG. 8 of the startup operation for the multi-output power supply device 1. FIG. 8 is a timing chart showing the startup waveforms of each output voltage. During startup with VCC (ENUP=High, XENDWN=Low, CSWON=High), the step-down DC/DC converters 10, 20 and the current switch 50 begin startup when VCC reaches the UVLO release voltage (3.7 V (typ.)). Step-up DC/DC converter 30 begins startup 50 ms (typ.) later at the reset release point (when the reset signal XRESET switches from the low level to the high level). The step-up DC/DC converter 30 is forcibly shifted to the shutdown operation when, for whatever reason, the VCC voltage falls, the output from the step-down DC/DC converters 10, 20 falls, and a reset due to the shutdown operation is detected (the reset signal XRESET switches from the high level to the low level).

Figure 9:
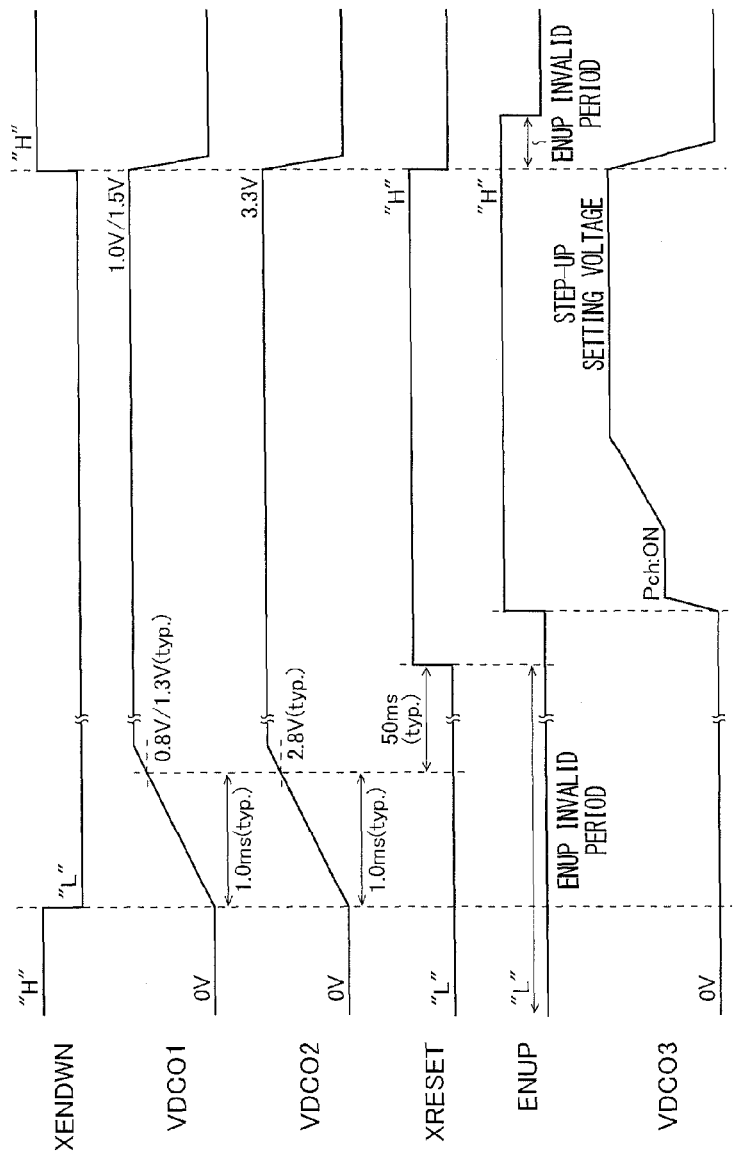
FIG. 9 is a timing chart used to explain step-up DC/DC converter control using pin 27 (ENUP)

The following is a detailed explanation with reference to FIG. 9 of step-up DC/DC converter control using pin 27 (ENUP). FIG. 9 is a timing chart used to explain step-up DC/DC converter control using pin 27 (ENUP). When the step-up DC/DC converter 30 is controlled using pin 27 (ENUP), control using pin 27 (ENUP) is invalid and the step-up DC/DC converter 30 continues to be forcibly shut down while the reset signal XRESET is at the low level. In other words, pin 27 (ENUP) can be used in a case where the step-up DC/DC converter 30 is to be controlled on a given timing after the reset signal XRESET has been set from the low level to the high level and the reset state has been released.

Figure 10:
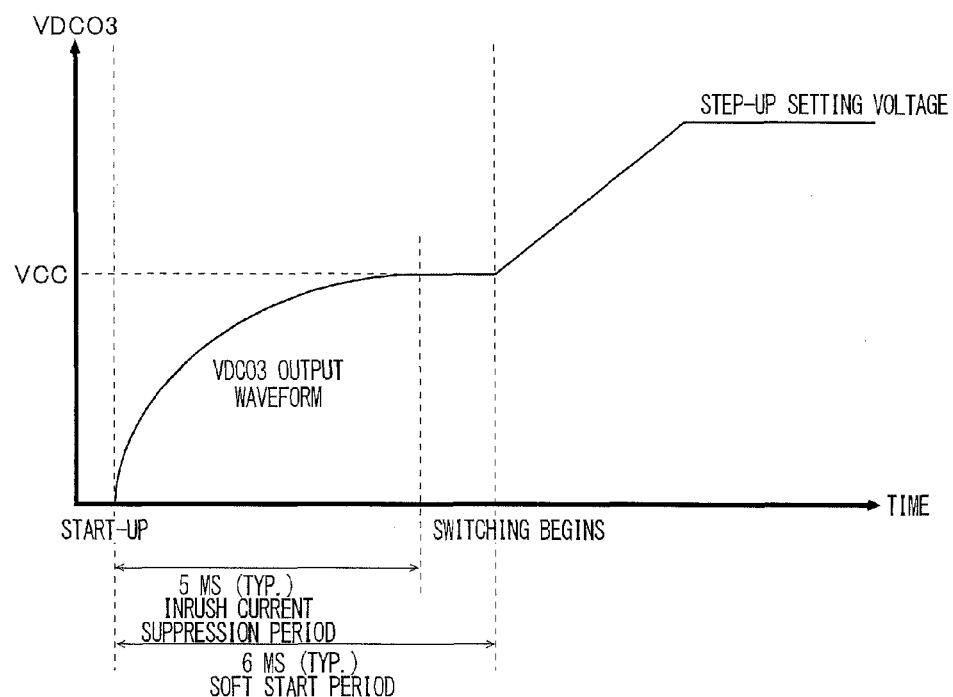
FIG. 10 is a timing chart used to explain the inrush current suppression function for the step-up DC/DC converter 30.

The following is a detailed explanation with reference to FIG. 10 of the inrush current suppression function of the step-up DC/DC converter 30. FIG. 10 is a timing chart used to explain the inrush current suppression function for the step-up DC/DC converter 30. During startup of the step-up DC/DC converter 30, output voltage VDCO3 has to be raised from 0 V to a voltage near power supply voltage VCC until the switching begins. In the multi-output power supply device 1 in this embodiment, the built-in inrush current suppression function is invalid for 5 ms (typ.) after startup of the step-up DC/DC converter 30 and, as shown in FIG. 10, inrush current is suppressed by gradually increasing output voltage VDCO3. The soft start (standby) interval ends after 1 ms (typ.) of the inrush current suppression interval, and the soft start circuit built into the multi-output power supply device 1 in the embodiment gradually increases output voltage VDCO3 to the voltage value determined by the set resistance ratio. Because the inrush current suppression function has maximum effect when the load current at startup is zero, there should be as little output current as possible at startup.

Figure 11:
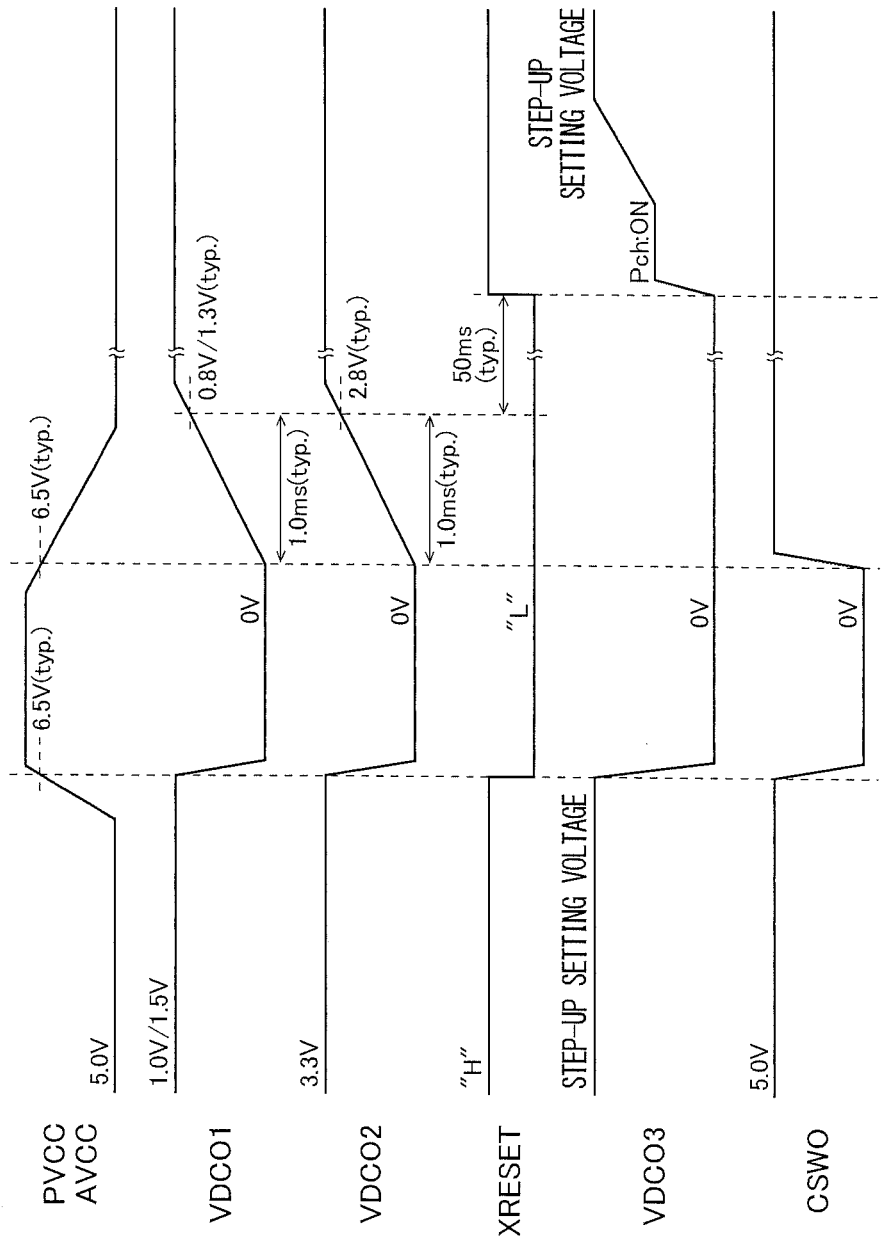
FIG. 11 is a timing chart showing waveforms during operation of the overvoltage mute function.

The following is a detailed explanation with reference to FIG. 11 of the overvoltage mute function and the UVLO function. FIG. 11 is a timing chart showing waveforms during operation of the overvoltage mute function. In FIG. 11, ENUP=CSWON=High, and XENDWN=SELSQ=Low. When the overvoltage mute function is operating, output from the step-up DC/DC converter 30, the step-down DC/DC converters 10, 20, and the current switch 50 are all shut down, and discharging is performed by the resistors built into the multi-output power supply device 1. When the UVLO function is operating, the operation is similar to the overvoltage mute function.

Figure 12A:
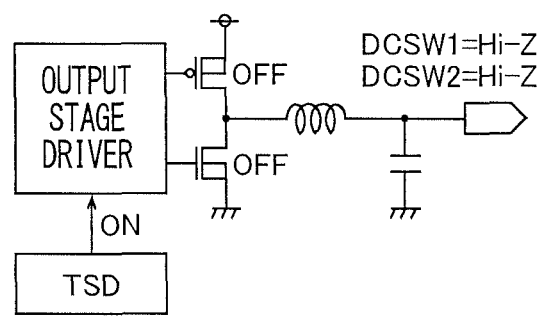
FIG. 12A is a block diagram showing the output state of step-down DC/DC converters 10 and 20 during thermal shutdown.
Figure 12B:
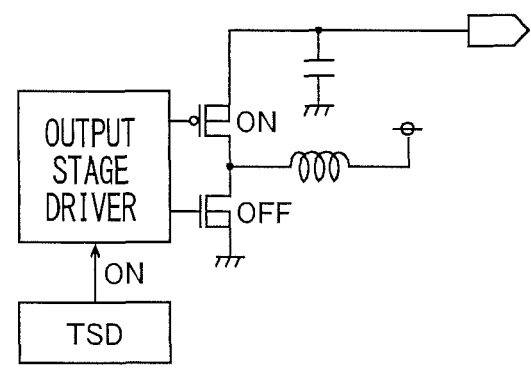
FIG. 12B is a block diagram showing the output state of the step-up DC/DC converter 30 during thermal shutdown.

The following is a detailed explanation of thermal shutdown function with reference to FIG. 12A and FIG. 12B. FIG. 12A is a block diagram showing the output state of step-down DC/DC converters 10 and 20 during thermal shutdown, and FIG. 12B is a block diagram showing the output state of step-up DC/DC converter 30 during thermal shutdown. As shown in FIG. 12A, DCSW1 and DCSW2 of the step-down DC/DC converters 10, 20 are both in the high impedance state during thermal shutdown. As shown in FIG. 12B, the PMOS transistor 32 is ON and the NMOS transistor 31 is OFF among the power transistors forming the step-up DC/DC converter 30 during thermal shutdown. The operations related to CSWO for the current switch 50 are similar to those during shutdown.

Figure 13:
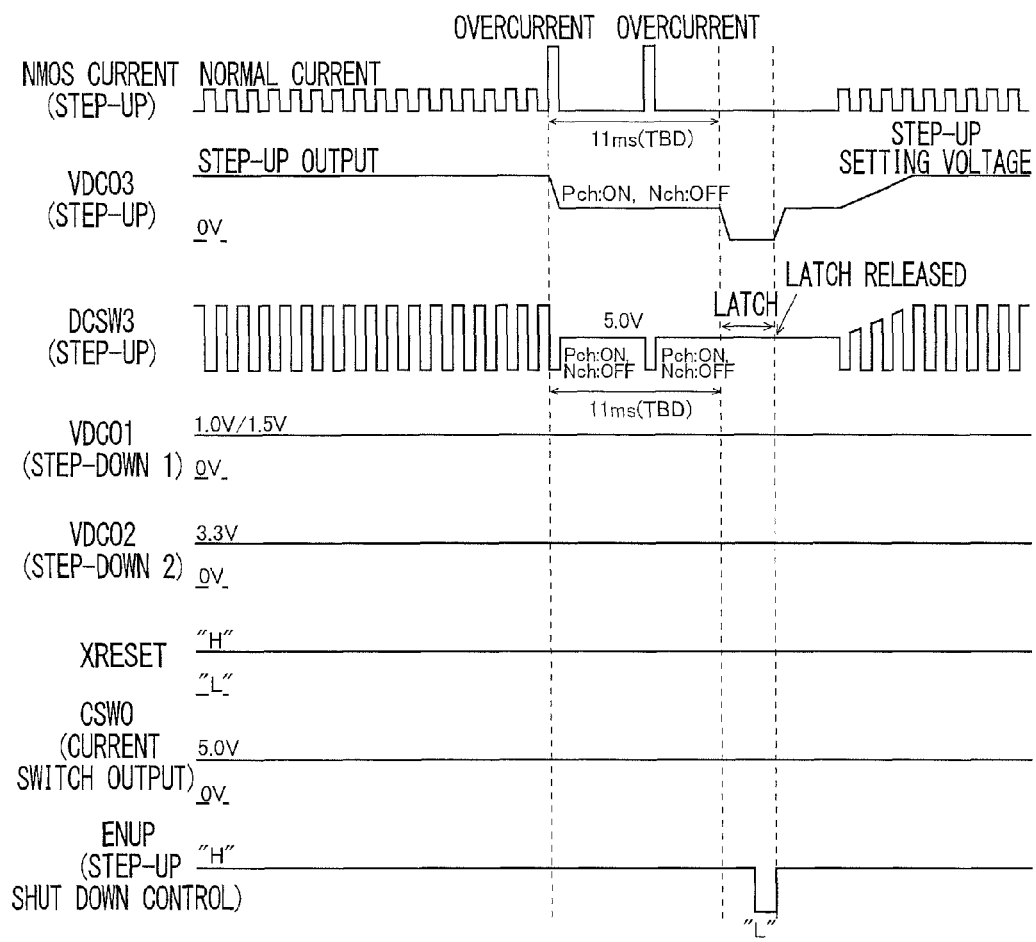
FIG. 13 is a timing chart used to explain the overcurrent detection operation for step-up DC/DC converter 30.

The following is a detailed explanation with reference to FIG. 13 of the overcurrent protection function of the step-up DC/DC converter 30. FIG. 13 is a timing chart used to explain the overcurrent detection operation for step-up DC/DC converter 30. In the step-up DC/DC converter 30, the current flowing to the NMOS transistor 31 is monitored, and the NMOS transistor 31 is turned OFF during an overcurrent (3.0 A (typ.)). When an overcurrent has been detected, the NMOS transistor 31 is turned OFF, and the soft start function is reactivated to return to normal operation. When a second overcurrent is detected within 11 ms (typ.) of detecting the first overcurrent, and latching is performed 11 ms (typ.) after detection of the first overcurrent with the PMOS the transistor 32 turned ON and the NMOS transistor 31 turned OFF. The output operations of the step-down DC/DC converters 10, 20 and the output operation of the current switch 50 continue regardless of the overcurrent detection operation of the step-up DC/DC converter 30. The latch state is released by performing power-on again in the latch state or performing shutdown with the ENUP terminal, and the step-up DC/DC converter 30 recovers.

Figure 14:
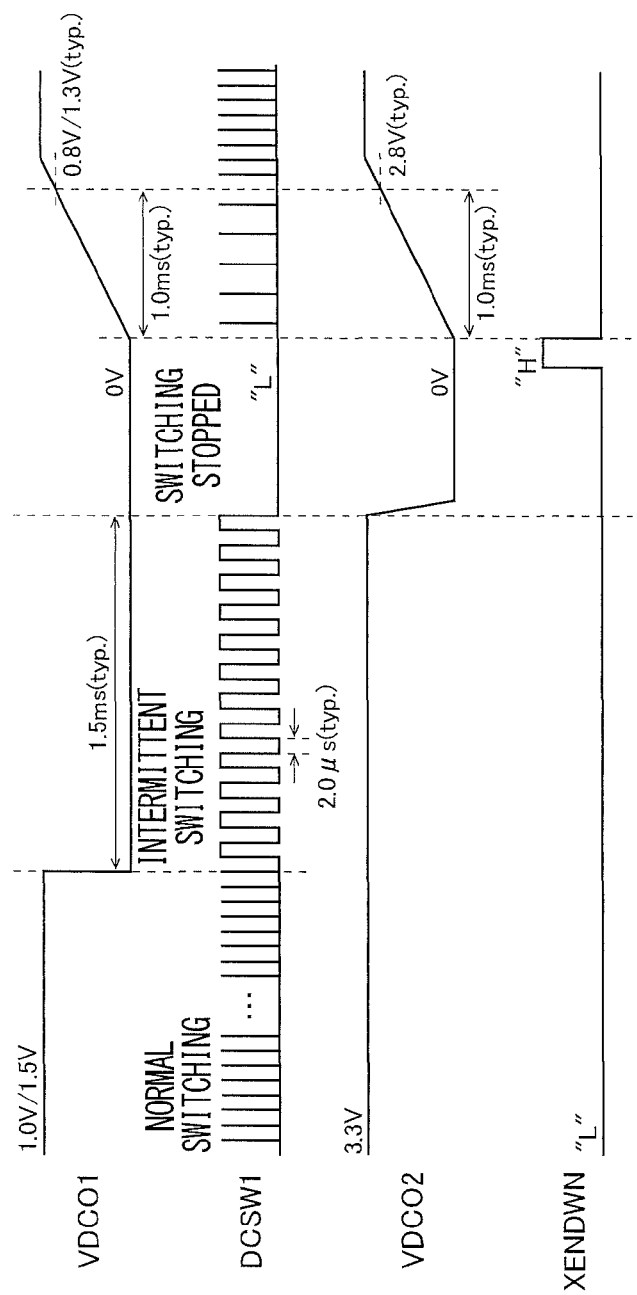
FIG. 14 is a timing chart used to explain the overcurrent detection operation for step-down DC/DC converters 10 and 20 (when performing VDCO1 overcurrent detection)

The following is a detailed explanation with reference to FIG. 14 of the overcurrent protection function of the step-down DC/DC converters 10, 20. FIG. 14 is a timing chart used to explain the overcurrent detection operation for step-down DC/DC converters 10 and 20 (when performing VDCO1 overcurrent detection). Charging of the output capacitor by PVCC is prohibited for an interval of 2.0 μs during overcurrent detection (1.5 A (typ.)). When detection of overcurrent continues over an interval of 1.5 ms (typ.), the short-circuit protection circuit is activated, latching is performed, and switching of the output from the step-down DC/DC converter 10, 20 is stopped (DCSW1=0V, DCSW2=0V). The output operation of the current switch 50 continues regardless of the overcurrent detection operation for the step-down DC/DC converters 10, 20. The step-up DC/DC converter 30 shifts to the shutdown operation when a reset is detected due to falling output from the step-down DC/DC converters 10, 20. The latch state is released by performing power-on again in the latch state or performing shutdown with the XENDWN terminal, and the step-down DC/DC converters 10, 20 recover.

Figure 15:
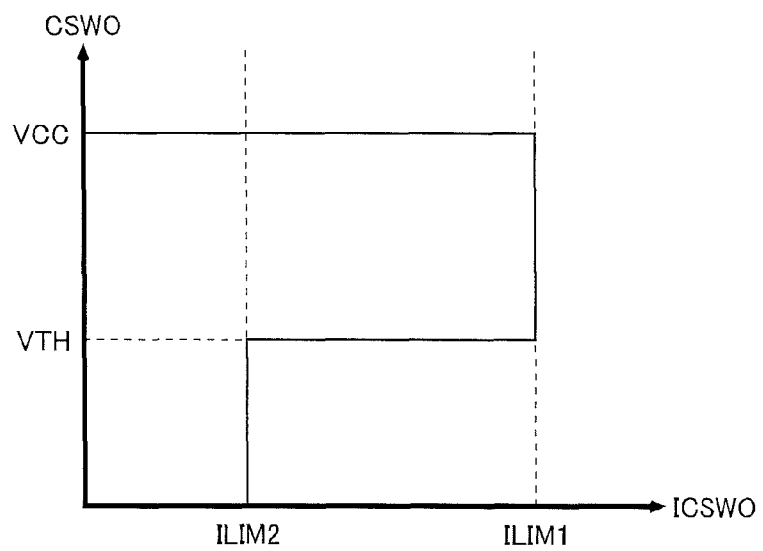
FIG. 15 is a diagram showing an example of overcurrent detection characteristics for the current switch 50.
Figure 16:
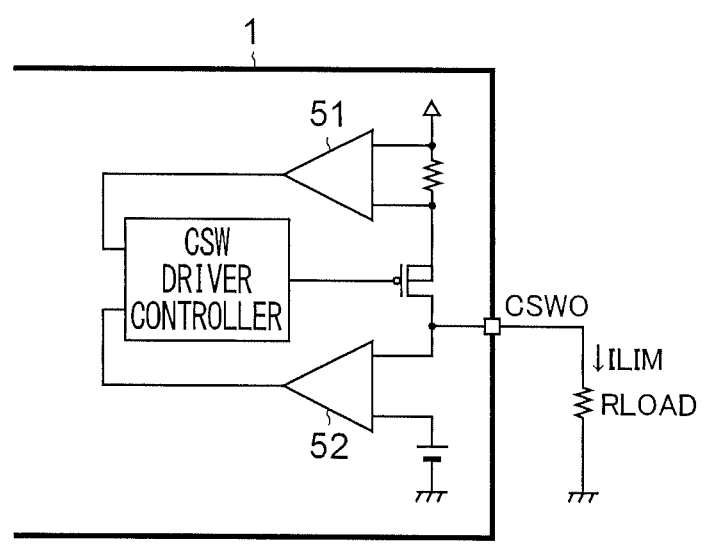
FIG. 16 is a block diagram showing a configuration example of the overcurrent protection function section of the current switch 50.

The following is a detailed explanation of the overcurrent protection function of the current switch 50 with reference to FIG. 15 and FIG. 16. FIG. 15 is a diagram showing an example of overcurrent detection characteristics for the current switch 50. FIG. 16 is a block diagram showing a configuration example of the overcurrent protection function section of the current switch 50. When an overcurrent has occurred at the CSWO terminal, the overcurrent detection comparator 51 in the multi-output power supply device 1 is activated, and the amount of current flowing to the output is limited to ILIM1. When the output voltage is less than the threshold value VTH of the output voltage detection comparator 52, the limit current value is further limited to ILIM2. The step-up DC/DC converter 30 and the step-down DC/DC converters 10, 20 continue to operate regardless of the operation of the overcurrent protection circuit.

FIG. 17 is a table showing equivalent circuits such as input/output for each terminal.

Figure 18:
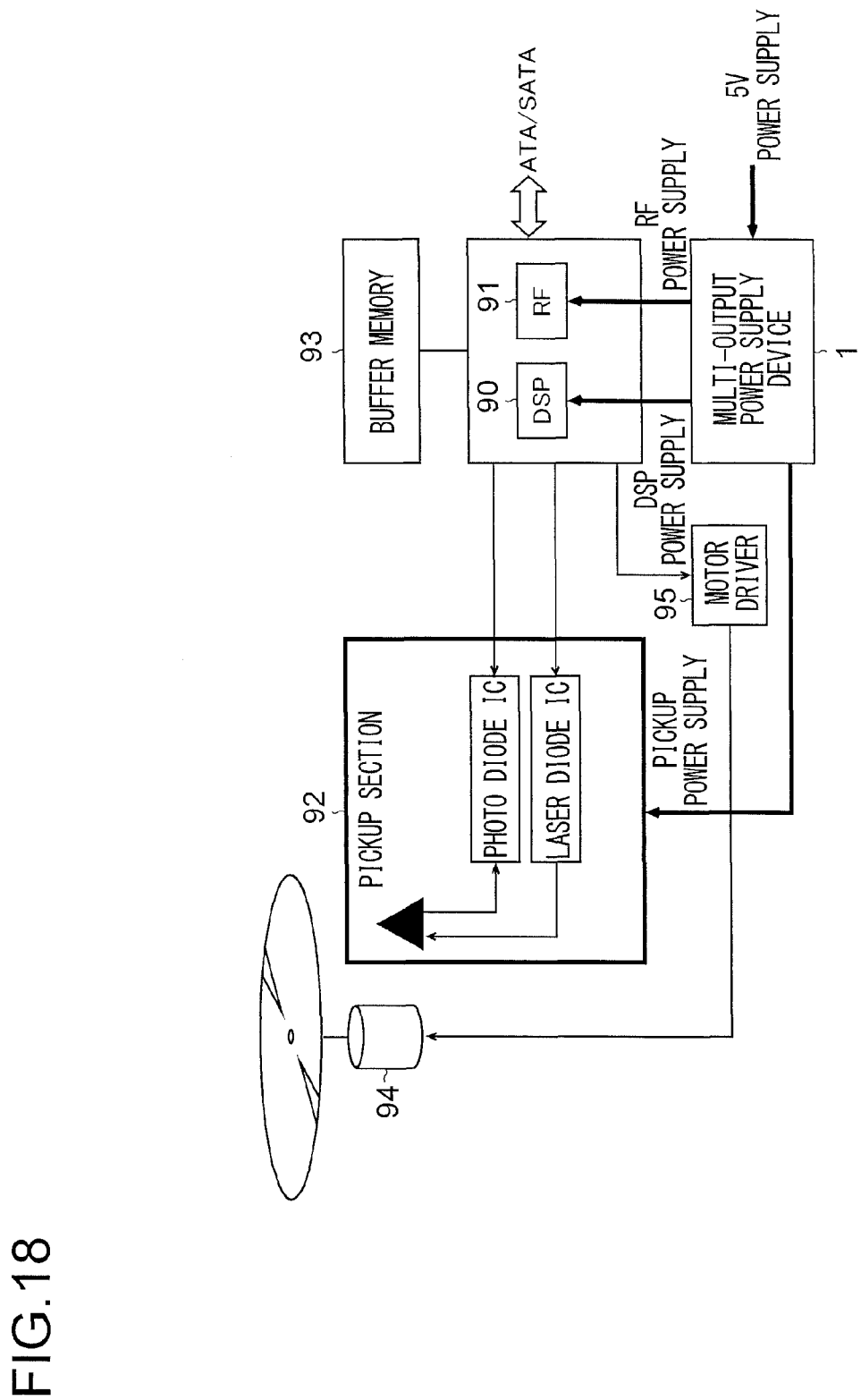
FIG. 18 is a block diagram showing an example of an application for an optical disk device.
Figure 19:
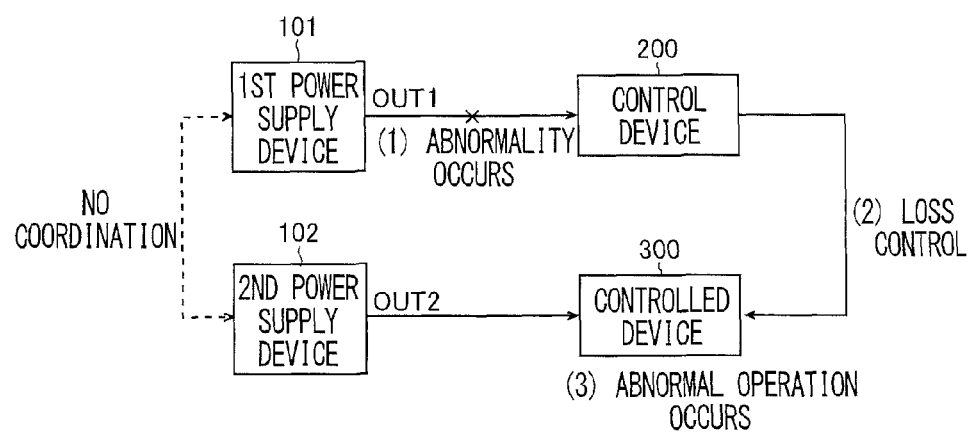
FIG. 19 is a block diagram showing a prior art example of a system requiring a plurality of drive voltages.

FIG. 18 is a block diagram showing an example of an application for an optical disk device. The optical disk device in this configuration example has a digital signal processor (DSP) 90, a radio frequency (RF) circuit 91, a pickup section 92, a buffer memory 93, a spindle motor 94, and a motor driver 95. It also uses the multi-output power supply device 1 in the embodiment as a single-chip power supply IC for comprehensive management of the power supply to the DSP 90, RF circuit 91, and pickup section 92.

The output voltages of the step-down DC/DC converters 10, 20 are used, respectively, as the DSP power supply, and the RF power supply, and the output voltage of the step-up DC/DC converter 30 is used as the pickup power supply.

Use of this configuration can prevent malfunctioning of the pickup section 92 and damage to the laser chip. Reducing the number of parts can contribute to space saving and the realization of a more compact device. Also, the suppression of step-up DC/DC inrush current can prevent startup failure.

It is possible to make modifications to the configuration of the present invention other than the embodiments described above without departing from the spirit of the present invention. For example, in the embodiments, the power supply circuits built into the IC include a step-down DC/DC converter for synchronous rectification, a step-up DC/DC converter, and a current switch. However, the configuration of the present invention is not limited to these embodiments. Other power supply circuits such as a series regulator or charge pump can be used, and any desired number of power supply circuits built into the IC can be used.

INDUSTRIAL APPLICABILITY

The present invention is a useful technology for improving the stability of systems requiring a plurality of drive voltages (e.g., optical disk devices, general consumer products).

LIST OF REFERENCE SIGNS

1 MULTI-OUTPUT POWER SUPPLY DEVICE
2 CONTROL DEVICE
2a CPU
2b MEMORY
3 CONTROLLED DEVICE
3a LASER DRIVER
10 STEP-DOWN DC-DC CONVERTER (1.0 V/1.5 V OUTPUT)
11 P-CHANNEL MOS FIELD-EFFECT TRANSISTOR (OUTPUT SWITCH)
12 N-CHANNEL MOS FIELD-EFFECT TRANSISTOR (SYNCHRONOUS RECTIFICATION SWITCH)
13 CONTROL DRIVE SECTION
14 ERROR AMPLIFIER
15 PWM COMPARATOR
16 CURRENT LIMIT SECTION
20 STEP-DOWN DC-DC CONVERTER (3.3 V OUTPUT)
21 P-CHANNEL MOS FIELD-EFFECT TRANSISTOR (OUTPUT SWITCH)
22 N-CHANNEL MOS FIELD-EFFECT TRANSISTOR (SYNCHRONOUS RECTIFICATION SWITCH)
23 CONTROL DRIVE SECTION
24 ERROR AMPLIFIER
25 PWM COMPARATOR
26 CURRENT LIMIT SECTION
30 STEP-UP DC-DC CONVERTER
31 N-CHANNEL MOS FIELD-EFFECT TRANSISTOR (OUTPUT SWITCH)
32 P-CHANNEL MOS FIELD-EFFECT TRANSISTOR (SYNCHRONOUS RECTIFICATION SWITCH)
33 CONTROL DRIVE SECTION
34 ERROR AMPLIFIER
35 PWM COMPARATOR
36 CURRENT LIMIT SECTION
40 RESET CIRCUIT
41 OUTPUT ABNORMALITY DETECTING SECTION
411 1ST VOLTAGE DIVIDER
412 2ND VOLTAGE DIVIDER
413 1ST SELECTOR
414 2ND SELECTOR
415 1ST COMPARATOR
416 2ND COMPARATOR
417 3RD COMPARATOR
418 AND OPERATOR
42 TIMER LATCH SECTION
50 CURRENT SWITCH
51 OVERCURRENT DETECTING COMPARATOR
52 OUTPUT VOLTAGE DETECTING COMPARATOR
60 SAWTOOTH WAVE GENERATING CIRCUIT
70 BIAS CIRCUIT
81-86 BUFFERS
90 DSP
91 RF CIRCUIT
92 PICKUP SECTION
93 BUFFER MEMORY
94 SPINDLE MOTOR
95 MOTOR DRIVER
L1-L3 COILS
C1-C8 CAPACITORS
R1-R5 RESISTORS
SW1-SW6 SWITCHES
P BACKSIDE PAD

What is claimed is:

1. A multi-output power supply device comprising:
a first power supply arranged to output a first output voltage;
a second power supply arranged to output a second output voltage;
a third power supply arranged to output a third output voltage; and
a reset circuit arranged to monitor both the first output voltage and the third output voltage to detect an abnormality in each of the first output voltage and the third output voltage, and to output a first reset signal for forcibly stopping the output operation of the second power supply, wherein the reset circuit is provided apart from the first power supply, the second power supply, and the third power supply, and the reset circuit includes:
- an output abnormality detecting section arranged to output the first reset signal in accordance with the first output voltage and the third output voltage; and
- a timer arranged to output a second reset signal to both the first power supply and the third power supply after a predetermined period of time has elapsed since the input of the first reset signal, wherein the first power supply and the third power supply are both step-down DC/DC converters, and the second power supply is a step-up DC/DC converter, and the multi-output power supply device comprises, as circuit elements forming the first power supply, the second power supply, and the third power supply:
- a sawtooth wave generating circuit for outputting a first sawtooth wave, a second sawtooth wave, and a third sawtooth wave;
- a bias circuit for generating a first reference voltage, a second reference voltage, and a third reference voltage;
- a first error amplifier for amplifying error between the first output voltage and the first reference voltage;
- a first control drive section for comparing the output of the first error amplifier to the first sawtooth wave, and for outputting the first output voltage based on the results of the comparison;
- a second error amplifier for amplifying the error between the second output voltage and the second reference voltage;
- a second control drive section for comparing the output of the second error amplifier to the second sawtooth wave, and for outputting the second output voltage based on the results of the comparison;
- a third error amplifier for amplifying the error between the third output voltage and the third reference voltage; and
- a third control drive section for comparing the output of the third error amplifier to the third sawtooth wave, and for outputting the third output voltage based on the results of the comparison.

2. The multi-output power supply device of claim 1, further comprising:
a first terminal to which a predetermined voltage is input; wherein
the reset circuit outputs the first reset signal when a power supply voltage is at or below the predetermined voltage, or when an abnormality in each of the first output voltage and the third output voltage has been detected.

3. The multi-output power supply device of claim 1, wherein the reset circuit outputs a first reset signal so that the second power supply starts after the multi-output power supply device has started up, and after a predetermined period of time has elapsed since the first output voltage reached a predetermined voltage.

4. The multi-output power supply device of claim 3, wherein the predetermined period of time is 50 ms.

5. The multi-output power supply device of claim 1, wherein the first power supply, the second power supply, and the third power supply are all DC/DC converters for synchronous rectification.

6. The multi-output power supply device of claim 1, wherein the first sawtooth wave and the third sawtooth wave have opposite phases.

7. The multi-output power supply device of claim 1, further comprising:
a fourth power supply arranged to continue to perform an output operation as the fourth power supply even when an output abnormality in each of the first power supply and the third power supply has been detected.

8. The multi-output power supply device of claim 1, further comprising:
a control circuit to which the first output voltage is supplied; and
a controlled circuit to which the second output voltage is supplied, and which is controlled by the control circuit.

9. A multi-output power supply device comprising:
a control device power supply circuit arranged to generate a first output voltage and a second output voltage for a control device;
a controlled device power supply circuit arranged to generate a third output voltage for a controlled device controlled by the control device; and
a reset circuit arranged to monitor both the first output voltage and the second output voltage, to forcibly stop the output operation of the power supply circuit for the controlled device when an output abnormality of the power circuit for the control device has been detected, wherein the reset circuit is provided apart from the power supply circuit for the control device and the power supply circuit for the controlled device, and the reset circuit includes:
- an output abnormality detecting section arranged to output the first reset signal in accordance with the first output voltage and the second output voltage; and
- a timer arranged to output a second reset signal to the power supply circuit for the control device after a predetermined period of time has elapsed since the input of the first reset signal, and the power supply circuit for the control device includes:
- a first step-down DC/DC converter arranged to step down an input voltage and to generate the first output voltage, and
- a second step-down DC/DC converter arranged to step down the input voltage and to generate the second output voltage, and the power supply circuit for the controlled device includes:
- a step-up DC/DC converter arranged to step up the input voltage and to generate the third output voltage, and the multi-output power supply device comprises, as circuit elements forming the first step-down DC/DC converter, the second step-down DC/DC converter, and the step-up DC/DC converter:
- a sawtooth wave generating circuit for outputting a first sawtooth wave, a second sawtooth wave, and a third sawtooth wave;
- a bias circuit for generating a first reference voltage, a second reference voltage, and a third reference voltage;
- a first error amplifier for amplifying error between the first output voltage and the first reference voltage;
- a first control drive section for comparing the output of the first error amplifier to the first sawtooth wave, and for outputting the first output voltage based on the results of the comparison;
- a second error amplifier for amplifying the error between the second output voltage and the second reference voltage;
- a second control drive section for comparing the output of the second error amplifier to the second sawtooth wave, and for outputting the second output voltage based on the results of the comparison;

a third error amplifier for amplifying the error between the third output voltage and the third reference voltage; and a third control drive section for comparing the output of the third error amplifier to the third sawtooth wave, and for outputting the third output voltage based on the results of the comparison.

10. The multi-output power supply device of claim 9 wherein the first step-down DC/DC outputs the first output voltage to a CPU forming the control device, the second step-down DC/DC converter outputs the second output voltage to memory forming the control device, and the step-up DC/DC converter outputs a third output voltage to a laser driver forming the controlled device.

11. The multi-output power supply device of claim 10 wherein the reset circuit forcibly stops the output operation of the step-up DC/DC converter when an output abnormality of either the first step-down DC/DC converter or the second step-down DC/DC converter has been detected, and forcibly stops the other output operation of the first step-down DC/DC converter and the second step-down DC/DC converter when the output abnormality has continued for a predetermined period of time.

12. The multi-output power supply device of claim 9 comprising:

a load power supply circuit arranged to continue to perform an output operation as the load power supply circuit even when an output abnormality has been detected in the power supply circuit for the control device.

13. An electric apparatus comprising:

the multi-output power supply device of claim 9;

a control device caused to operate upon receiving a power supply from the multi-output power supply device; and a controlled device caused to operate upon receiving a power supply from the multi-output power supply device, the controlled device being controlled by the control device.

14. The electric apparatus of claim 13, further comprising:

a motor driver controlled by the control device, and a spindle motor driven by the motor driver, wherein the controlled device has a pickup section for retrieving information from a disk caused to rotate by the spindle motor.

15. A multi-output power supply device comprising:

a first power supply for outputting a first output voltage;

a second power supply for outputting a second output voltage;

a third power supply for outputting a third output voltage; and a reset circuit for detecting an abnormality in each of the first output voltage and the third output voltage, and for outputting a first reset signal for forcibly stopping the output operation of the second power supply, wherein the first power supply and the third power supply are both step-down DC/DC converters, and the second power supply is a step-up DC/DC converter, and wherein the multi-output power supply device further comprises as circuit elements forming the first power supply, the second power supply, and the third power supply:

a sawtooth wave generating circuit for outputting a first sawtooth wave, a second sawtooth wave, and a third sawtooth wave;

a bias circuit for generating a first reference voltage, a second reference voltage, and a third reference voltage;

a first error amplifier for amplifying error between the first output voltage and the first reference voltage;

a first control drive section for comparing the output of the first error amplifier to the first sawtooth wave, and for outputting the first output voltage based on the results of the comparison;

a second error amplifier for amplifying the error between the second output voltage and the second reference voltage;

a second control drive section for comparing the output of the second error amplifier to the second sawtooth wave, and for outputting the second output voltage based on the results of the comparison;

a third error amplifier for amplifying the error between the third output voltage and the third reference voltage; and a third control drive section for comparing the output of the third error amplifier to the third sawtooth wave, and for outputting the third output voltage based on the results of the comparison.

16. The multi-output power supply device of claim 15, wherein the first sawtooth wave and the third sawtooth wave have opposite phases.

* * * * *